(12) United States Patent
Tanaka et al.

(10) Patent No.: US 6,927,518 B2
(45) Date of Patent: Aug. 9, 2005

(54) DIRECT CURRENT MACHINE HAVING CONTINUOUSLY ARRANGED MAGNETIC POLES

(75) Inventors: Takeshi Tanaka, Toyohashi (JP); Hiroyuki Harada, Hamamatsu (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 0 days.

(21) Appl. No.: 10/862,344

(22) Filed: Jun. 8, 2004

(65) Prior Publication Data

US 2004/0251760 A1 Dec. 16, 2004

(30) Foreign Application Priority Data

Jun. 10, 2003 (JP) .......................................... 2003-165232
Sep. 19, 2003 (JP) .......................................... 2003-328643

(51) Int. Cl.[7] .............................................. H02K 21/26
(52) U.S. Cl. ............................ 310/154.06; 310/154.02; 310/154.21
(58) Field of Search ........................ 310/154.02, 154.06, 310/154.21–154.27, 130, 165, 195, 234

(56) References Cited

U.S. PATENT DOCUMENTS

| 4,341,969 | A | * | 7/1982 | Sievert | .................. | 310/154.21 |
|---|---|---|---|---|---|---|
| 4,774,426 | A | * | 9/1988 | Mohr et al. | ............. | 310/154.22 |
| 4,899,074 | A | * | 2/1990 | West | ..................... | 310/154.27 |
| 6,342,744 | B1 | | 1/2002 | Harada et al. | | |
| 6,580,237 | B2 | | 6/2003 | Harada et al. | | |
| 6,628,030 | B2 | | 9/2003 | Harada et al. | | |
| 6,720,697 | B2 | | 4/2004 | Harada et al. | | |
| 2003/0189384 | A1 | | 10/2003 | Harada et al. | | |

FOREIGN PATENT DOCUMENTS

JP          A-2002-095230          3/2002

* cited by examiner

Primary Examiner—Thanh Lam
(74) Attorney, Agent, or Firm—Posz Law Group, PLC

(57) ABSTRACT

When one of armature coils is in a beginning of a commutation process, a center line of a trailing end tooth of a corresponding group of teeth, around which the one of the armature coils is wound, is generally aligned with a corresponding boundary between magnets. When the one of the armature coils is in an end of the commutation process, a center line of a leading end tooth of the corresponding group of the teeth is generally aligned with another boundary between the magnets.

14 Claims, 15 Drawing Sheets

INDUCED VOLTAGE

INDUCED VOLTAGE

US 6,927,518 B2

DIRECT CURRENT MACHINE HAVING CONTINUOUSLY ARRANGED MAGNETIC POLES

CROSS REFERENCE TO RELATED APPLICATION

This application is based on and incorporates herein by reference Japanese Patent Application No. 2003-165232 filed on Jun. 10, 2003 and Japanese Patent Application No. 2003-328643 filed on Sep. 19, 2003.

BACKGROUND OF THE INVENTION

1. Field of the Invention

The present invention relates to a direct current machine, such as a direct current motor.

2. Description of Related Art

One previously known direct current machine, such as a direct current motor, includes magnets of different polarities (N-pole and S-pole), an armature, a commutator and two brushes. The direct current motor is rotated when a direction of electric current, which is supplied to each corresponding armature coil, is switched through the brushes and the commutator.

At the time of switching the direction of electric current, i.e., at the time of commutation, due to inductance of the armature coils, a negative effect, which tends to retard a linear change of the electric current, occurs to cause insufficient commutation. In such a case, the electric current, which flows from the commutator to the armature coils, could be forcefully stopped at a late stage of the commutation to cause generation of sparks (commutation sparks). This phenomenon is known to cause brush wearing, noise generation, electromagnetic noise generation or the like. Thus, it has been demanded to address such a disadvantage.

Japanese Unexamined Patent Publication No. 2002-95230 addresses the above disadvantage and discloses a direct current motor, which achieves improved commutation by changing distribution of the magnetic flux (i.e., distribution of magnetic flux density) of each magnet to change the amount of magnetic flux, which passes across each corresponding armature coil that is under the commutation process.

FIG. 21 shows a direct current motor 71 recited in Japanese Unexamined Patent Publication No. 2002-95230. Specifically, a motor housing 77 receives a pair of magnets 72, 73. The magnets 72, 73 form an N-pole and an S-pole, respectively, and are opposed to one another about an armature 74. The armature 74 includes an armature core 78, armature coils 79a, 79b and a commutator 80. Twelve teeth 78a are formed in the armature core 78. Each armature coil 79a, 79b is wound around a corresponding group of six teeth 78a. Although not depicted, each of the rest of armature coils is similarly wound around a corresponding group of six teeth 78a.

The commutator 80 is arranged at one end of the armature 74. The commutator 80 includes a plurality of segments (commutator segments) 76. Adjacent two segments 76a, 76b are connected to one another by the corresponding armature coil 79a, and adjacent two segments 76c, 76d are connected to one another by the corresponding armature coil 79b. Brushes 75a, 75b are urged against the commutator 80 to slidably engage the commutator 80. Direct current, which is supplied from a direct current power source (not shown), is applied to the armature coils 79a, 79b through the brushes 75a, 75b and the corresponding segments 76 of the commutator 80.

When the armature 74 is rotated in a direction of X, the segments 76a, 76b are short circuited by the brush 75a, so that short circuit electric current flows through the armature coil 79a. Furthermore, the segments 76c, 76d are also short circuited by the brush 75b, so that short circuit electric current flows through the armature coil 79b. During the short circuiting by the corresponding brush 75a, 75b, direction of electric current, which flows in the corresponding armature coil 79a, 79b, is switched, so that the armature 74 is further rotated in the clockwise direction (in the direction of X in FIG. 21). As shown in FIG. 21, the twelve segments 76 are arranged at 30 degree intervals in the circumferential direction, and the direction of the electric current in each corresponding armature coil 79a, 79b is switched. More specifically, the commutation process of the armature coil 79a, 79b is performed during 30 degree rotation of the armature 74.

The magnet 72 includes a main magnetic pole 72a (N-pole) and two end magnetic poles 72b, 72c (S-poles). The end magnetic poles 72b, 72c extend from opposite ends, respectively, of the main magnetic pole 72a. The magnet 73 includes a main magnetic pole 73a (S-pole) and two end magnetic poles 73b, 73c (N-poles). The end magnetic poles 73b, 73c extend from opposite ends, respectively, of the main magnetic pole 73a. During a first half of the commutation process, a leading end 78b of the leading end tooth, which is wound with the armature coil 79a under the commutation process, is located at the end magnetic pole 72b of the magnet 72, which is located in a front end of the magnet 72 in the rotational direction of the armature 74. During a last half of the commutation process, the leading end 78b is located at the end magnetic pole 73c of the magnet 73, which is located in a rear end of the magnet 73 in the rotational direction of the armature 74. Furthermore, during the first half of the commutation process, a leading end 78b of the leading end tooth, which is wound with the armature coil 79b under the commutation process, is located at the end magnetic pole 73b of the magnet 73, which is located in a front end of the magnet 73 in the rotational direction of the armature 74. During the last half of the commutation process, the leading end 78b is located at the end magnetic pole 72c of the magnet 72, which is located in a rear end of the magnet 72 in the rotational direction of the armature 74.

With the above arrangement, in the first half of the commutation process, the magnetic flux, which passes through the armature coil 79a, is reduced by the end magnetic pole 72b (the S-pole), which has the polarity opposite from that of the main magnetic pole 72a (the N-pole). In the last half of the commutation process, the magnetic flux, which passes through the armature coil 79a, is increased by the end magnetic pole 73c (the N-pole), which has the same polarity as that of the main magnetic pole 72a (the N-pole). Furthermore, in the first half of the commutation process, the magnetic flux, which passes through the armature coil 79b, is reduced by the end magnetic pole 73b (the N-pole), which has the polarity opposite from that of the main magnetic pole 73a (the S-pole). In the last half of the commutation process, the magnetic flux, which passes through the armature coil 79b, is increased by the end magnetic pole 72c (the S-pole), which has the same polarity as that of the main magnetic pole 73a (the S-pole). Thus, in the first half of the commutation process, induced voltage, which is generated due to a change in the magnetic flux that passes through the armature coil 79a, 79b under the commutation process, acts in a commutation retarding direction for retarding the commutation. Contrary to this, in the last half of the commutation process, induced voltage, which is generated due to a change in the magnetic flux that passes through the armature coil 79a, 79b under the commutation process, acts in a commutation facilitating direction for facilitating the commutation. In this way, the commutation can be improved.

Furthermore, it has been also proposed to form the magnets 72, 73 in such a manner that the end magnetic pole 72b and the end magnetic pole 73c are directly connected to one another, and the end magnetic pole 72c and the end magnetic pole 73b are directly connected to one another in the above direct current motor 71. In this way, the magnets 72, 73 extend along the entire inner peripheral surface of the motor housing 77, so that the magnetic flux of the magnets 72, 73 can be effectively used.

In the above direct current motor 71, the magnetic flux is changed by providing the end magnetic poles 72b, 72c, 73b, 73c in the opposite ends, respectively, of each main magnetic pole 72a, 73a to improve the commutation. However, in the direct current motor 71, the end magnetic pole 72b (the S-pole), which has the polarity opposite from that of the main magnetic pole 72a (the N-pole), is provided in the front circumferential end portion of the magnet 72 located in the front end of the magnet 72 in the rotational direction of the armature 74. Also, the end magnetic pole 73b (the N-pole), which has the polarity opposite from that of the main magnetic pole 73a (the S-pole), is provided in the front circumferential end portion of the magnet 73 located in the front end of the magnet 73 in the rotational direction of the armature 74. In order to reduce the amount of magnetic flux, which passes through the armature coil 79a, 79b under the commutation process, the amount of magnetic flux, which contributes to rotation of the armature 74 is disadvantageously reduced.

Furthermore, in general, in the direct current motor, when electric current flows through the armature coil, a magnetic flux is generated by armature magnetomotive force, so that the magnetic flux of the permanent magnets is influenced. This phenomenon is known as armature reaction. When the armature reaction is relatively large, spatial distribution of magnetic flux is substantially distorted. For example, when the induced voltage is increased by increasing the electric power supplied to the armature coil, the switching of the commutation electric current is delayed. Thus, at the end of the commutation process, electric current can be abruptly switched to cause generation of brush sparks. In order to limit this phenomenon, it has been demanded to reduce the influence of the armature reaction even in a case where electric power supplied to each corresponding armature coil is increased.

However, in the above direct current motor 71, the influence of the armature reaction at the time of increasing the electric power supplied to each corresponding armature coil 79a, 79b is not concerned. Thus, it has been demanded to limit inhibition of effective commutation by the armature reaction even in the case where the electric power supplied to the armature coil 79a, 79b is increased.

SUMMARY OF THE INVENTION

The present invention addresses the above disadvantage. Thus, it is an objective of the present invention to provide a direct current machine, which can improve commutation and can effectively use a magnetic flux of each magnet for rotation of an armature.

To achieve the objective of the present invention, there is provided a direct current machine, which includes a cylindrical yoke, a plurality of magnetic poles and an armature. The magnetic poles are continuously arranged one after the other along an entire inner peripheral surface of the cylindrical yoke to provide alternating magnetic polarities along the inner peripheral surface of the cylindrical yoke. The armature is received radially inward of the plurality of magnetic poles in the cylindrical yoke. The armature includes an armature core and a plurality of armature coils. The armature core includes a plurality of teeth, which are arranged at generally equal angular intervals. Each of the plurality of armature coils is wound around a corresponding group of teeth selected from the plurality of teeth. When one of the plurality of armature coils is in a beginning of a commutation process, a center line of a trailing end tooth of the corresponding group of the teeth, around which the one of the plurality of armature coils is wound, is generally aligned with a corresponding one of a plurality of boundaries, each of which is formed between corresponding adjacent two circumferential ends of the plurality of magnetic poles. When the one of the plurality of armature coils is in an end of the commutation process, a center line of a leading end tooth of the corresponding group of the teeth is generally aligned with a corresponding one of the plurality of boundaries.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION (First Embodiment)

An embodiment, in which the present invention is embodied in a blower motor that serves as a direct current machine, will be described with reference to FIGS. 1–5.

Figure 1:
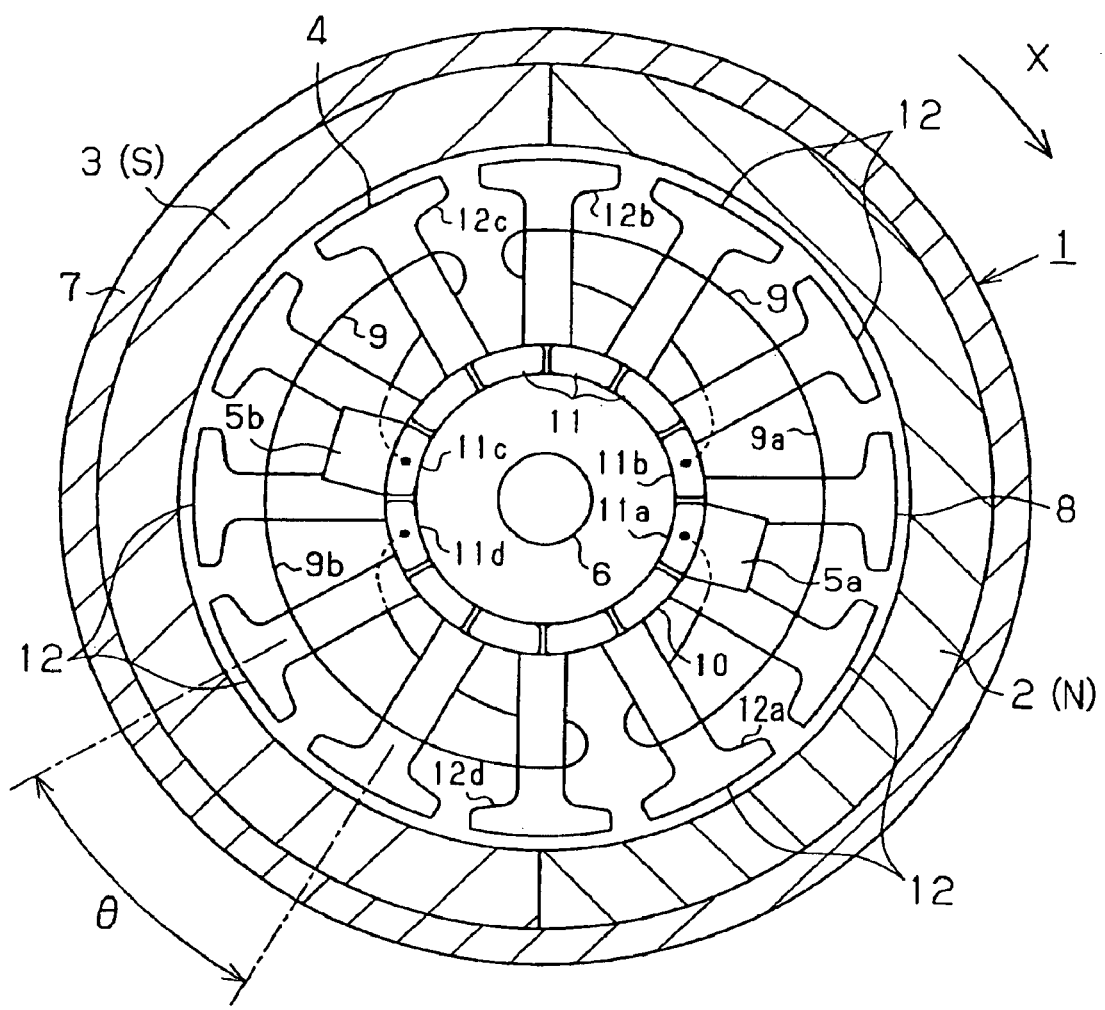
FIG. 1 is a schematic cross sectional view of a motor according to a first embodiment.
Figure 2A:
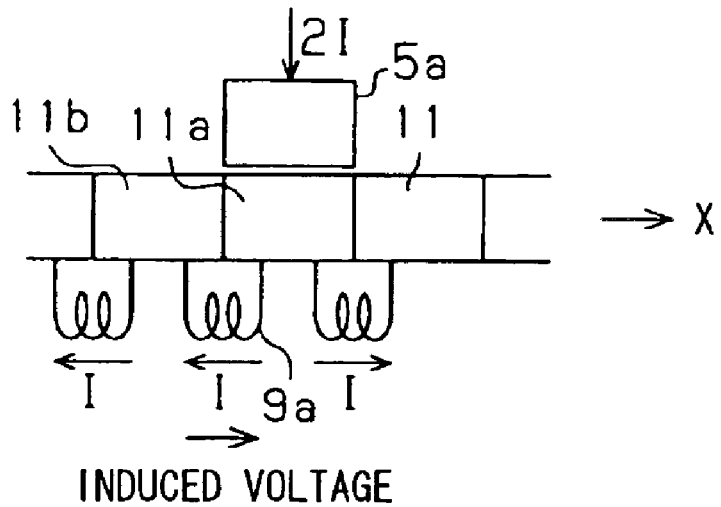
FIG. 2A is a schematic view showing one operational state during commutation.
Figure 2B:
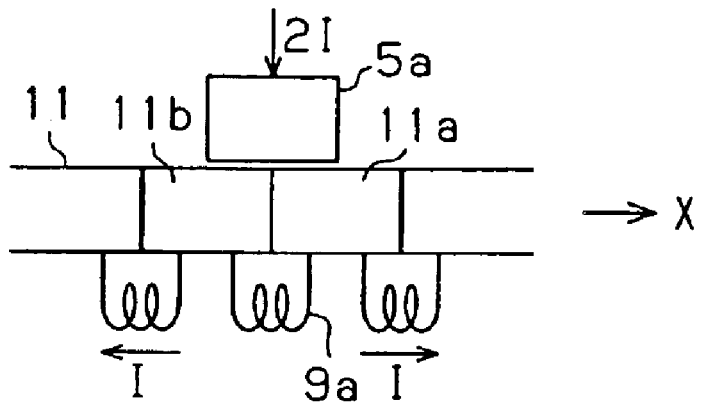
FIG. 2B is a schematic view showing another operational state during the commutation.
Figure 2C:
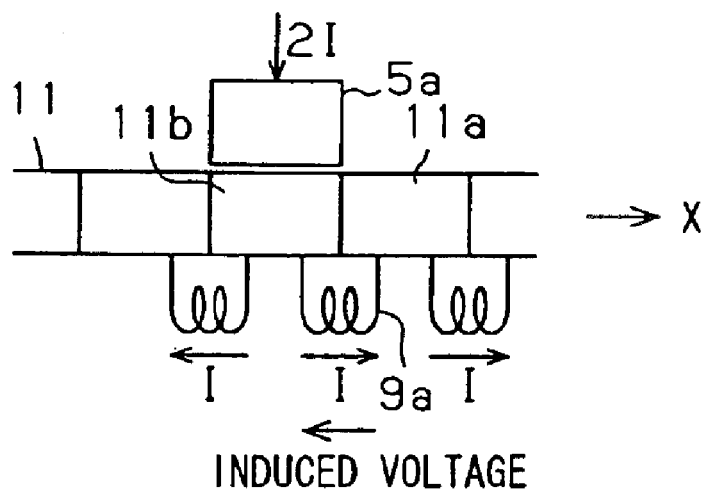
FIG. 2C is a schematic view showing another operational state during the commutation.

FIG. 1 is a partial cross sectional view showing a schematic structure of a motor 1 of the first embodiment, and FIGS. 2A–2C are descriptive views showing various operational states in a commutation process.

As shown in FIG. 1, in the motor 1, an armature 4, which is secured to a rotatable shaft 6, is rotatably supported in a motor housing 7 that is made as a yoke. Magnets (magnetic poles) 2, 3 are arranged continuously one after the other along the entire perimeter of the motor housing 7 in such a manner that the magnets 2, 3 are opposed to each other about the armature 4. Each magnet 2, 3 is formed into a semi-cylindrical shape, which has an arc angle of 180 degrees. The magnet 2 is magnetized to form an N-pole, and the magnet 3 is magnetized to form an S-pole. That is, the multiple magnets 2, 3 are alternately arranged to provide alternating magnetic polarities.

The armature 4 includes an armature core 8 and armature coils 9. The armature coils 9 are wound around the armature 8. The armature 4 is rotated upon supply of direct electric current.

The armature core 8 includes a plurality of teeth 12. Among the armature coils 9, each of armature coil 9a, 9b is wound around a corresponding group of teeth 12, the number of which is equal to one half of the total number of the teeth 12. In the present embodiment, the number of the teeth 12 is twelve, and these teeth 12 are arranged at 30 degree intervals in a circumferential direction of the armature 4. That is, each adjacent two teeth 12 are formed such that an angle between the center line of one of the teeth 12 and the center line of the other one of the teeth 12 (i.e., a motor armature slot angle, which will be hereinafter referred to as an angle between the adjacent teeth 12) is 30 degrees (=360 degrees/12). Each armature coil 9a, 9b is wound around the corresponding group of six teeth 12. The number of the teeth 12 present in each group of teeth 12 is set to have a total angular extent of 180 degrees that coincides with that of each magnet 2, 3. Furthermore, although not depicted, each of the rest of the armature coils 9 is similarly wound around a corresponding group of six teeth 12. That is, the winding pattern of the armature coils 9 is said to be a distributed winding.

A commutator 10, which has segments 11, is provided in one end of the armature 4. As shown in FIG. 1, each adjacent two segments 11 are connected to one another by the corresponding armature coil 9. First and second brushes 5a, 5b are opposed to one another about the commutator 10 and are urged against the segments 11 to slidably engage the segments 11. When direct electric current, which is supplied from a direct-current power source (not shown), is supplied to the armature coils 9a, 9b through the first and second brushes 5a, 5b and the corresponding segments 11 of the commutator 10, the armature 4 begins to rotate. More specifically, the paired adjacent segments 11 are short circuited through the corresponding one of the first and second brushes 5a, 5b, and thereafter a flow direction of electric current in each of the corresponding armature coils 9a, 9b is switched. In this way, the armature 4 continuously rotates in a clockwise direction in FIG. 1 (i.e., in a direction of arrow X in FIG. 1).

In the present embodiment, the twelve segments 11 are arranged at 30 degree intervals in the circumferential direction. When the armature 4 is rotated about 30 degrees relative to the first and second brushes 5a, 5b, the direction of electric current in each of the armature coils 9a, 9b switches. At this time, each of the corresponding armature coils 9a, 9b is said to be in a commutation process. This rotational range of the armature 4 is referred to as a commutating angular range (or simply referred to as a commutating range) of each of the armature coils 9a, 9b. That is, in a time period, during which the armature 4 rotates about 30 degrees, the commutation process takes place in each of the armature coils 9a, 9b.

In the present embodiment, an engaging arc angle, which corresponds to an engaging extent between each of the first and second brushes 5a, 5b and the corresponding opposed segment 11, is set to be generally the same as the angle θ between the adjacent teeth 12. The rotational angle of the armature 4, which corresponds to the commutating angular range of each armature coil 9, also corresponds to the angle θ between the adjacent teeth 12.

A change in the electric current, which is supplied from the first brush 5a to the armature coil 9a, will be described with reference to FIG. 2. In reality, the segments 11 shown in FIG. 2 are spaced from one another, as shown in FIG. 1.

First, as shown in FIG. 2A, at the beginning of the commutation process, the first brush 5a engages the segment 11a (FIG. 1), so that the electric current I flows in the armature coil 9a from right to left, and an induced voltage is generated in a counteracting direction (left to right in FIG. 2A) for counteracting against the electric current I. Then, as shown in FIG. 2B, the armature 4 rotates, and therefore the segments 11a, 11b move relative to the first brush 5a in the right direction (the direction of arrow X in FIG. 2B). Thus, the segments 11a, 11b are short circuited through the first brush 5a, and therefore the electric current, which flows through the armature coil 9a, becomes substantially zero. At this time, the induced voltage, which is generated in the armature coil 9a, also becomes zero. Thereafter, as shown in FIG. 2C, the armature 4 rotates further, and therefore, the segments 11a, 11b move relative to the first brush 5a in the right direction (the direction of arrow X in FIG. 2C). Thus, the electric current I flows left to right through the armature coil 9a, and the induced voltage is generated in a counteracting direction (right to left in FIG. 2C) for counteracting against the electric current I.

That is, when the armature 4 rotates in the order of FIGS. 2A, 2B and 2C, the direction of the electric current I, which flows through the armature coil 9a, is reversed, i.e., is switched. Also, the direction of the induced voltage, which is generated in the armature coil 9a, is reversed, i.e., is switched. The electromagnetic force of the armature coil 9a and the magnetic force of the magnets 2, 3 induce rotational force, so that the motor 1 is driven to rotate.

With reference to FIG. 1, a trailing end tooth 12b is located in a trailing end of the group of teeth 12, around which the armature coil 9a is wound. In other words, the trailing end tooth 12b is located in a rear end of this particular group of teeth 12 in the rotational direction of the armature 4. The position of the first brush 5a is set in such a manner that the center line of the trailing end tooth 12b is placed to radially oppose, i.e., is aligned with a boundary (a top side boundary in FIG. 1) between the magnet 2 (the N-pole) and the magnet 3 (the S-pole) when the armature 4 is located in the above-described rotational position, at which the commutation process of the armature coil 9a through the short circuiting via the first brush 5a begins. This state corresponds to the state shown in FIG. 2A. Similarly, a trailing end tooth 12d is located in a trailing end of the group of teeth 12, around which the armature coil 9b is wound. The position of the second brush 5b is set in such a manner that the center line of the trailing end tooth 12d is placed to radially oppose, i.e., is aligned with another boundary (a bottom side boundary in FIG. 1) between the magnet 2 (the N-pole) and the magnet 3 (the S-pole) when the armature 4 is located in the above-described rotational position, at which the commutation process of the armature coil 9b through the short circuiting via the second brush 5b starts.

With reference to FIG. 1, a leading end tooth 12a is located in a leading end of the group of teeth 12, around which the armature coil 9a commutated by the first brush 5a is wound. In other words, the leading end tooth 12 is located in a front end of this particular group of teeth 12 in the rotational direction of the armature 4. When the armature 4 rotates 15 degrees in the direction of arrow X in FIG. 1, a leading end (a front end in the rotational direction) of the leading end tooth 12a is placed to radially oppose, i.e., is aligned with the boundary (the bottom side boundary in FIG. 1) between the magnet 2 (the N-pole) and the magnet 3 (the S-pole). This state corresponds to the state shown in FIG. 2B. Furthermore, a leading end tooth 12c is located in a leading end of the group of teeth 12, around which the armature coil 9b commutated by the second brush 5b is wound. At this time, a leading end of the leading end tooth 12c is placed to radially oppose, i.e., is aligned with the boundary (the top side boundary in FIG. 1) between the magnet 2 (the N-pole) and the magnet 3 (the S-pole).

When the armature 4 further rotates 15 degrees in the direction of arrow X in FIG. 1, the commutation process in each of the armature coils 9a, 9b ends. At this time, the center line of the leading end tooth 12a is placed to radially oppose the boundary (the bottom side boundary in FIG. 1) between the magnet 2 (the N-pole) and the magnet 3 (the S-pole). This state corresponds to the state shown in FIG. 2C. Similarly, the center line of the leading end tooth 12c is placed to radially oppose the boundary (the top side boundary in FIG. 1) between the magnet 2 (the N-pole) and the magnet 3 (the S-pole) at this time.

Next, operation of the motor 1 (the direct current machine) will be described.

In FIG. 1, when electric power is supplied through the first and second brushes 5a, 5b, the armature 4 is rotated in the direction of arrow X in FIG. 1. Thus, the leading end tooth 12a of the group of the six teeth 12, around which the armature coil 9a that is currently under the commutation process is wound, moves through an angular interval of 15 degrees (=θ/2). This angular interval of 15 degrees extends from a front circumferential end of the magnet 2, which is located in a front end of the magnet 2 in the rotational direction of the armature 4. Then, the leading end tooth 12a further moves through another angular range of 15 degrees (=θ/2). This angular range of 15 degrees extends from a rear circumferential end of the magnet 3, which is a rear end of the magnet 3 in the rotational direction of the armature 4. Also, the leading end tooth 12c of the group of the six teeth 12, around which the armature coil 9b that is currently under the commutation process is wound, moves through an angular range of 15 degrees (=θ/2). This angular range of 15 degrees extends from a front circumferential end of the magnet 3, which is located in a front end of the magnet 3 in the rotational direction of the armature 4. Then, the leading end tooth 12c further moves through another angular range of 15 degrees (=θ/2). This angular range of 15 degrees extends from a rear circumferential end of the magnet 2, which is a rear end of the magnet 2 in the rotational direction of the armature 4.

A magnetic flux passes through the leading end tooth 12a, 12c of the group of the six teeth 12, around which the armature coil 9a, 9b that is currently in the commutation process is wound. Effects of this magnetic flux will be described with reference to a motor 81 shown in FIG. 5.

Figure 5:
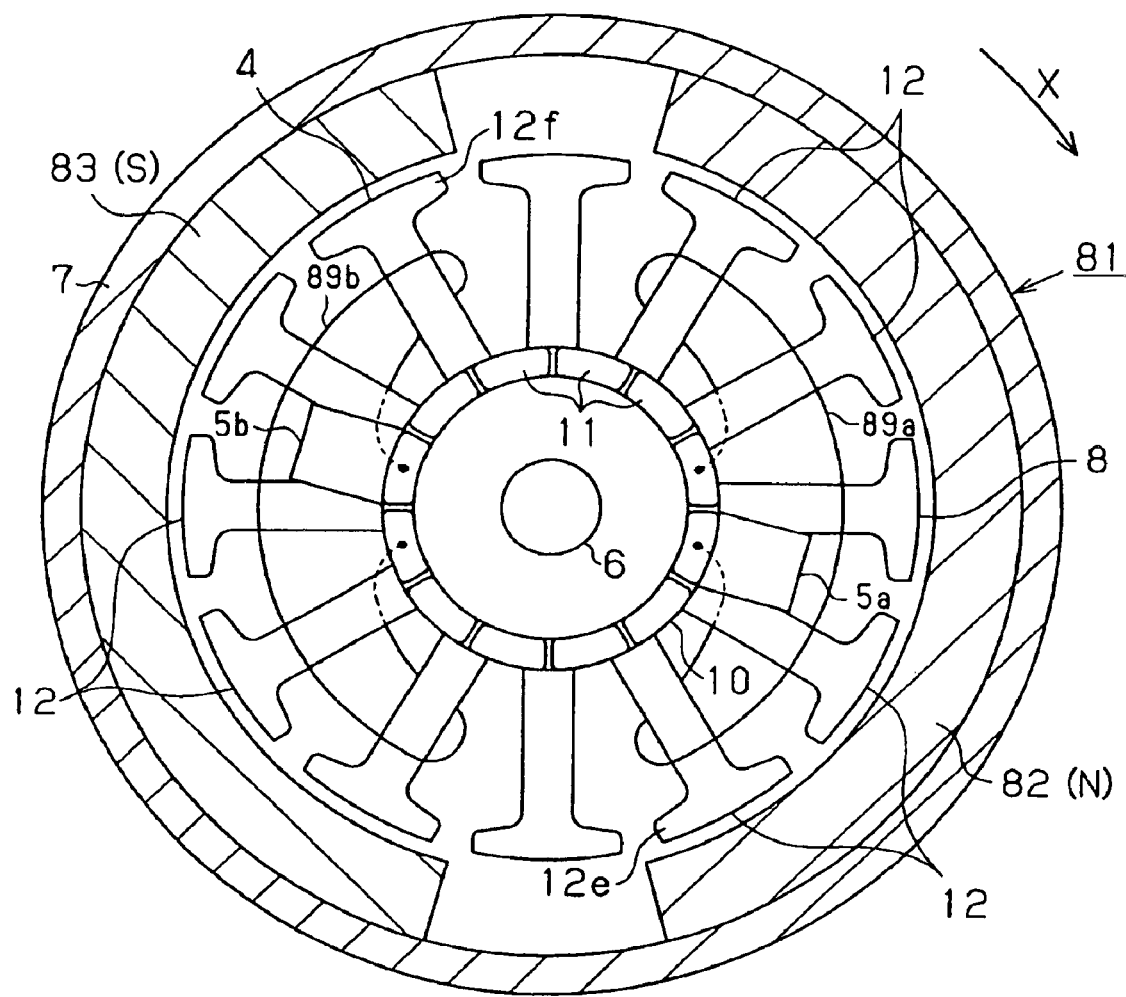
FIG. 5 is a cross sectional view of a motor of a comparative example.

As shown in FIG. 5, the motor 81, which serves as a comparative example, has a pair of magnets 82, 83. The magnets 82, 83 form an N-pole and an S-pole, respectively. An arc angle (an angular extent) of each magnet 82, 83 is 150 degrees. In response to the arc angle of the magnet 82, 83, each of armature coils 89a, 89b is wound around a corresponding group of five teeth 12. A winding angle of each of the armature coils 89a, 89b (i.e., an angle between a leading end and a trailing end of the group of the five teeth 12, around which the armature coil 89 is wound) is set to be 150 degrees. Although not depicted, it should be understood that each of the rest of the armature coils is similarly wound around a corresponding group of five teeth 12.

Figure 3:
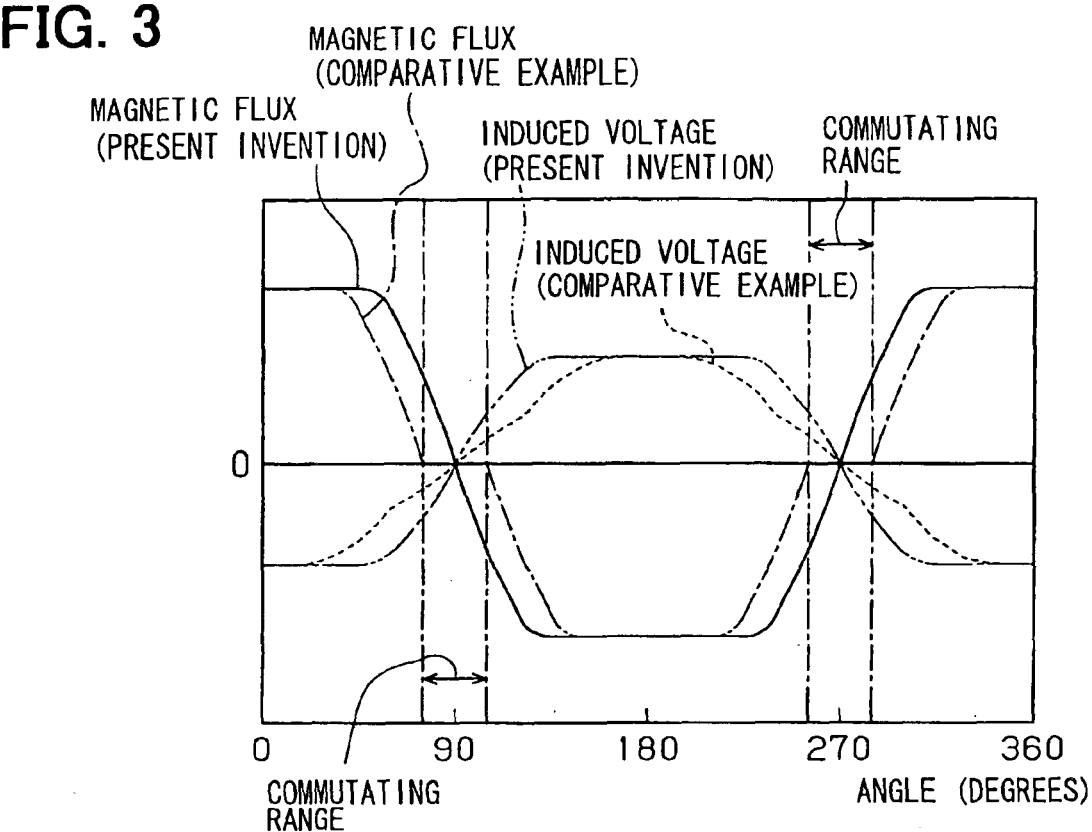
FIG. 3 is a waveform chart showing a change in magnetic flux and a change in induced voltage with respect to a rotational position of an armature of the motor.

FIG. 3 is a waveform chart, which shows a change in a magnetic flux and a change in an induced voltage with respect to a rotational position of the armature 4 of the present invention. FIG. 3 also shows a change in a magnetic flux and a change in an induced voltage with respect to a rotational position of the armature 4 of the motor 81 (FIG. 5) of the comparative example.

In FIG. 3, a reference position of the armature coil 9 is a position of a leading end of the armature coil 9, and this reference position of the armature coil 9 is rotated through a range of 0–360 degrees to measure the above-described changes in the armature coil 9. The position of the leading end of the armature coil 9 coincides with the center line of a slot, which is located between the leading end tooth 12a of the group of teeth 12, around which the armature coil 9 is wound, and a next tooth 12, which is next to the leading end tooth 12a in the rotational direction of the armature 4. Therefore, in the state of FIG. 1, when the top end point is assumed to be zero degrees, the position of the armature coil 9 is rotated 165 degrees from the top end point in the direction of X.

The magnetic flux shown in FIG. 3 is a sum of the magnetic fluxes of the magnets 2, 3 and the magnetic flux generated at the time of rotating the armature 4 (i.e., the magnetic flux generated by the electric current that passes through the armature coils 9). The induced voltage shown in FIG. 3 is a sum of the induced voltage generated by the above magnetic flux and the induced voltage generated by the magnetic flux at the time of rotating the armature 4.

With reference to FIG. 3, in the motor 1 of the present invention, the magnets 2, 3 are present throughout the commutating angular ranges (the commutating ranges) of the leading end teeth 12a, 12c wound with the armature coils 9a, 9b, respectively, which are currently under the commutation process. Thus, the magnetic flux changes even in the commutating angular range in the motor 1. Contrary to this, in the motor 81 of the comparative example, the magnets are not present throughout the commutating angular ranges of the leading end teeth 12e, 12f wound with the armature coils 89a, 89b, respectively, which are currently under the commutating process. Thus, the magnetic flux is zero in each commutating angular range of the motor 81. As a result, a slope of the induced voltage, which is generated in the motor 1 of the present invention in the respective commutating angular range is greater than a slope of the induced voltage, which is generated in the motor 81 of the comparative example in the respective commutating angular range. Therefore, the value of the induced voltage of the present invention at the beginning of the commutation process becomes greater than that of the induced voltage of the comparative example. As described above, in this way, the sufficient amount of induced voltage is ensured at the beginning of the commutation process according to the present embodiment. Thus, the commutation of the armature coil 9a, 9b proceeds effectively.

Figure 4:
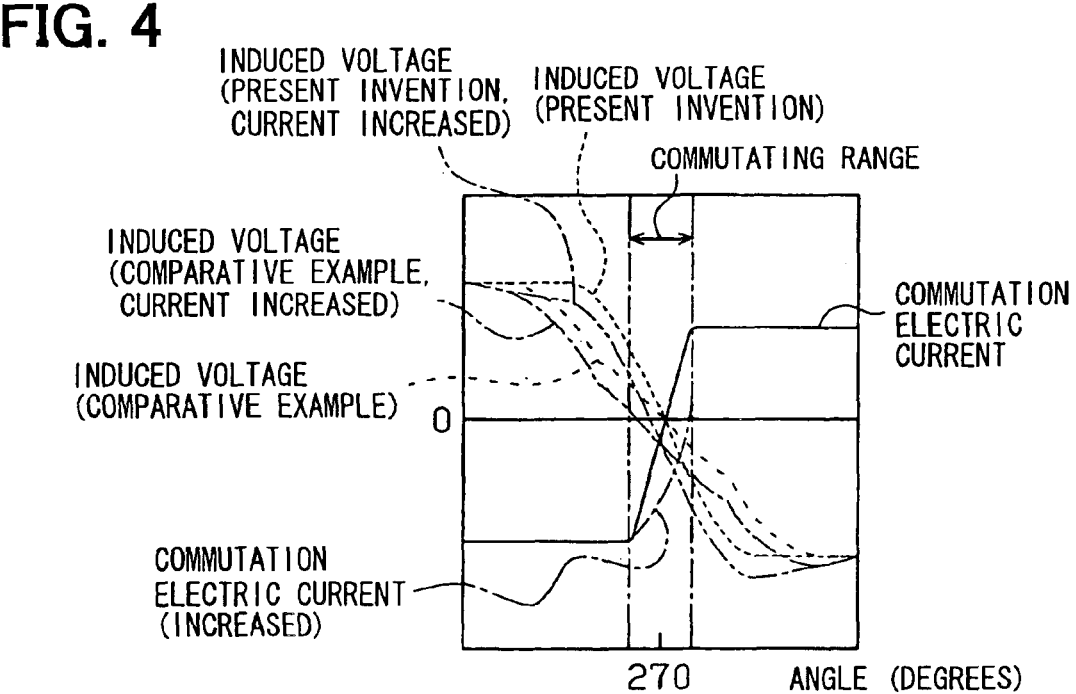
FIG. 4 is a waveform chart showing a change in electric current and a change in induced voltage at the time of commutation.

FIG. 4 shows a change in the commutation electric current and a change in the induced voltage during the commutation process. FIG. 4 also shows a change in the commutation electric current and a change in the induced voltage at the time of increasing the electric power supplied to the armature coils 9a, 9b. For comparative purpose, FIG. 4 further shows a change in the commutation electric current and a change in the induced voltage during the commutation process in the motor 81 (FIG. 5) and also shows a change in the commutation electric current and a change in the induced voltage at the time of increasing the electric power supplied to the armature coils 89a, 89b.

As shown in FIG. 4, when the supplied electric power is increased, the induced voltage of the motor 1 and the induced voltage of the motor 81 change. In the commutating angular range, the curve, which indicates the induced voltage generated in the motor 1 of the present invention, shifts downwardly at the time of increasing the supplied electric power. Furthermore, in the commutating angular range (the commutating range), the curve, which indicates the induced voltage generated in the motor 81 of the comparative example, also shifts downwardly at the time of increasing the supplied electric power. This is probably due to the following reason. That is, when the electric power supplied to the armature coils 9a, 9b or to the armature coils 89a, 89b is increased, the armature magnetomotive force is generated due to armature reaction, and thereby the magnetic flux is influenced. This causes a deviation of a neutral axis in the motor housing 7, so that the induced voltage changes.

As shown in FIG. 4, in the motor 1, even when the electric power supplied to the armature coils 9a, 9b is increased, and thereby the induced voltage is deviated due to the armature reaction, the slope of the induced voltage is still greater than that of the comparative example. Thus, the sufficient amount of induced voltage is provided at the beginning of the commutation process in the motor 1 of the present embodiment.

As a result, in the motor 1 of the present invention, the sufficient amount of induced voltage can be obtained at the beginning of the commutation process regardless of the amount of electric current, which passes through the armature coil 9a, 9b, and the induced voltage is generated in the facilitating direction for facilitating the commutation process. Thus, it is possible to limit abrupt switching of the electric current at the end of the commutation process.

Accordingly, the motor 1 (the direct current machine) of the present embodiment provides the following advantages.

(1) In the present embodiment, each armature coil 9a, 9b is wound around the corresponding group of teeth 12, and the number of the teeth 12 present in the group of teeth 12 is set to have the predetermined total angular extent, which is the same as that of each magnet 2, 3. Furthermore, at the beginning of the commutation process, the center line of the trailing end tooth 12b, 12d, which is wound with the armature coil 9a, 9b that is under the commutation process, is placed to radially oppose the corresponding boundary between the magnets 2, 3. At the end of the commutation process, the center line of the leading end tooth 12a, 12c, which is wound with the armature coil 9a, 9b that is under the commutation process, is placed to radially oppose the corresponding boundary between the magnets 2, 3.

Thus, in the first half of the commutation process, the leading end tooth 12a, 12c, which is wound with the armature coil 9a, 9b that is under the commutation process, is positioned in one of the magnets 2, 3. Then, in the later half of the commutation process, the leading end tooth 12a, 12c, which is wound with the armature coil 9a, 9b that is under the commutation process, is position in the other one of the magnets 2, 3. Therefore, in the switching point, at which the direction of the electric current that passes through the armature coil 9a, 9b is switched, the amount of magnetic flux, which is generated by the magnets 2, 3 and passes across the armature coil 9a, 9b, changes. In comparison to the case where the magnet is not provided in the commutating angular range, the slope of the induced voltage is greater in the present embodiment. In this way, the sufficient amount of induced voltage is obtained at the beginning of the commutation process, and thereby the commutation process is facilitated to improve the commutation. Furthermore, the effect of the armature reaction, which is induced due to the flow of the electric current in the armature coil 9a, 9b, can be reduced. More specifically, even when the magnetic field is disturbed by the armature reaction, the sufficient amount of induced voltage can be obtained at the beginning of the commutation process to facilitate the commutation. Thus, it is possible to limit the abrupt switching of the electric current (the abrupt stop of the electric current), which is otherwise induced due to a delay in the switching of the electric current at the end of the commutation process.

(2) In the present embodiment, the magnetic flux of the one of the magnets 2, 3 contributes generation of the rotational force for rotating the armature 4 until the electric current that passes through the armature coil 9a, 9b is switched. When the electric current that passes through the armature coil 9a, 9b is switched, the magnetic flux of the other one of the magnets 2, 3 contributes generation of the rotational force for rotating the armature 4. That is, the magnetic flux, which causes generation of the force that acts against the rotation of the armature 4, does not pass through the teeth 12. Therefore, the magnetic flux of the magnets 2, 3 can be effectively used to rotate the armature 4.

(Second Embodiment)

A second embodiment of the present invent invention will be described with reference to FIGS. 6 to 9. The components similar to those of the first embodiment will not be described or depicted.

Figure 6:
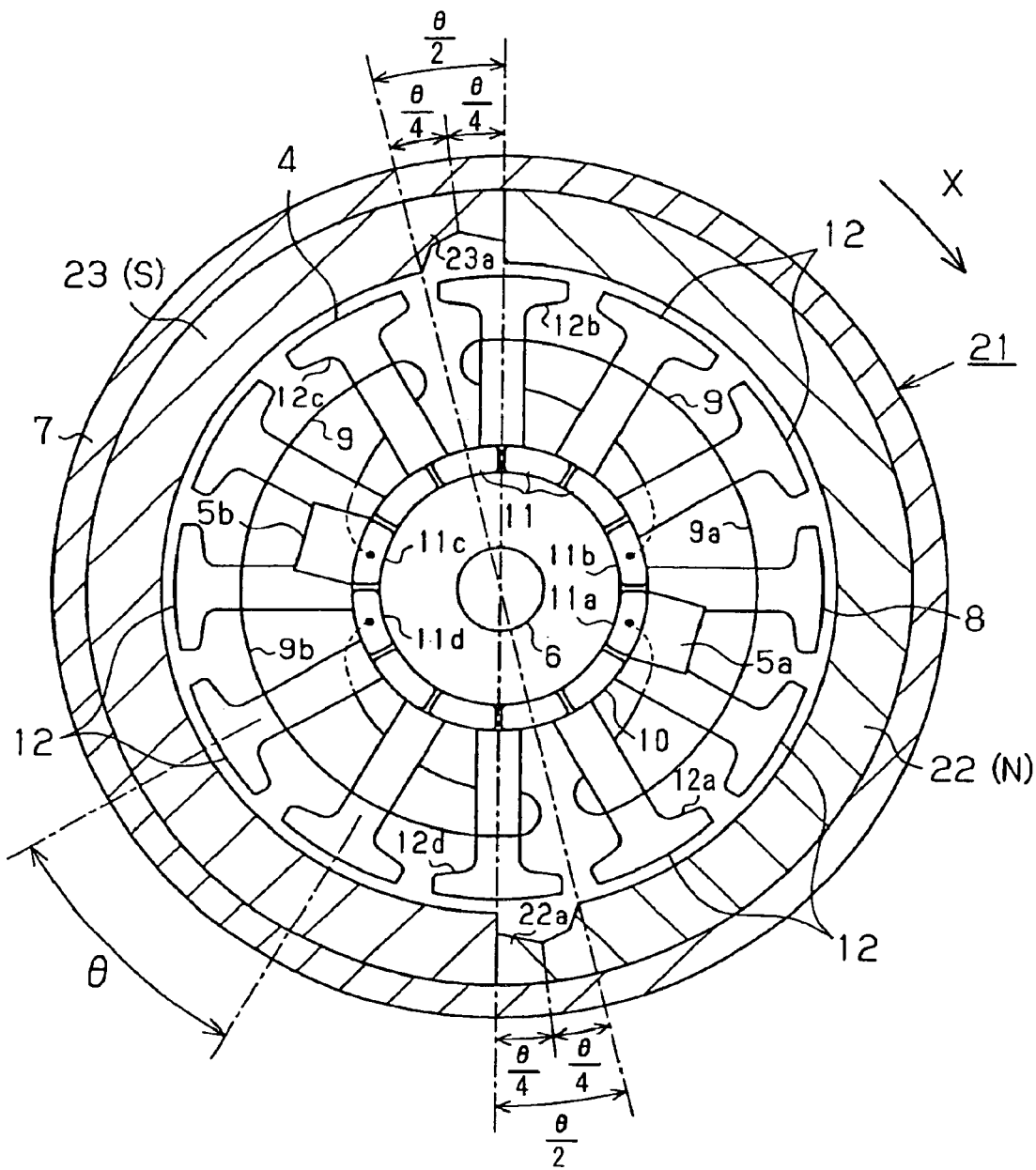
FIG. 6 is a cross sectional view of a motor according to a second embodiment of the present invention.

FIG. 6 is a partial cross sectional view showing a schematic structure of a motor 21 according to the second embodiment. As shown in FIG. 6, the motor 21 of the present embodiment includes magnets 22, 23 in place of the magnets 2, 3 of the first embodiment.

Each magnet 22, 23 is formed into a semi-cylindrical shape, which has an arc angle (angular extent) of 180 degrees. A front circumferential end portion of each magnet 22, 23, which is located in a front end of the magnet 22, 23 in the rotational direction of the armature 4, is radially notched or is radially recessed to form a reduced magnetic flux portion 22a, 23a. An angular extent of each reduced magnetic flux portion 22a, 23a measured in the circumferential direction of the armature 4 is about one half (=θ/2) of the angle between the adjacent teeth 12.

Because of the provision of the notch (or the recess), the radial thickness of each reduced magnetic flux portion 22a, 23a becomes smaller than that of the rest of each magnet 22, 23. More specifically, the radial thickness of each reduced magnetic flux portion 22a, 23a is reduced in comparison to an adjacent section of the magnet 22, 23 that is located adjacent to the reduced magnetic flux portion 22a, 23a. By reducing the radial thickness of the reduced magnetic flux portion 22a, 23a, the magnetic flux of the reduced magnetic flux portion 22a, 23a is smaller than that of the rest of the magnet 22, 23, i.e., is reduced in comparison to the adjacent section of the magnet 22, 23. Furthermore, each reduced magnetic flux portion 22a, 23a is formed in such a manner that the radial thickness of the reduced magnetic flux portion 22a, 23a progressively decreases from each of opposed circumferential ends of the reduced magnetic flux portion 22a, 23a toward the circumferential center of the reduced magnetic flux portion 22a, 23a. That is, the radial thickness of the reduced magnetic flux portion 22a, 23a progressively decreases in an angular extent of θ/4, which begins from the front circumferential end of the magnet 22, 23 that is the front end in the rotational direction armature 4. Then, the radial thickness of the reduced magnetic flux portion 22a, 23a progressively increases in another angular extent of θ/4. Thus, the magnetic flux, which passes across the leading end tooth 12a, 12c that is wound with the armature coil 9a, 9b under the commutation process, decreases in a commutation initial period after initiation of the commutation process (in a range that corresponds to the arc angle of θ/4 after the initiation of the commutation process in the present embodiment). Thereafter, this magnetic flux increases until the middle point of the commutation process.

Next, operation of the motor 21 will be described.

In FIG. 6, similar to the first embodiment, when the direct electric current is supplied through the first and second brushes 5a, 5b, the armature 4 rotates in the direction of X in FIG. 6. Then, commutation is carried out through the first and second brushes 5a, 5b.

Figure 7:
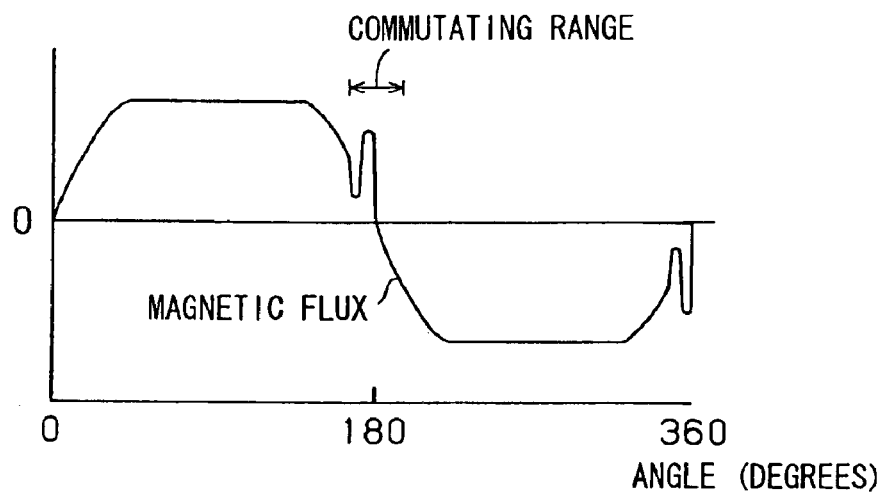
FIG. 7 is a waveform chart showing distribution of magnetic flux (magnetic flux density) of the motor of the second embodiment.

FIG. 7 is a waveform chart, which shows distribution of the magnetic flux (magnetic flux density) in the motor 21 of the present embodiment. As shown in FIG. 7, in the motor 21 of the present embodiment constructed in the above manner, the direction of the magnetic flux that passes through the armature 4 is reversed on opposite sides of a range, thorough which the leading end tooth 12a passes through during the commutation process of the armature coil 9a, i.e., on opposite sides of the commutating angular range. More specifically, through the rotation of the armature 4, the magnetic flux, which passes through the leading end tooth 12a, rapidly decreases and thereafter increases once again in the first half of the commutating angular range (i.e., the initial period of the commutation process) due to the influences of the reduced magnetic flux portion 22a, 23a formed in each magnet 22, 23. Thereafter, this magnetic flux decreases once again and becomes zero at the middle of the commutating angular range (i.e., at 0 degrees and at 180 degrees). Then, in the last half of commutating angular range (in the last stage of the commutation process), the magnetic flux, which has the polarity opposite from that of the magnetic flux observed at the beginning of the commutation process, increases.

More specifically, in a range between the beginning of the commutation process and the ¼ of the commutating angular range (i.e., the range between the start point of the commutation process and the angular point of θ/4), the magnetic flux, which passes through the leading end tooth 12a that is wound with the armature coil 9a commutated by the first brush 5a, decreases due to the decrease in the radial thickness in the reduced magnetic flux portion 22a. Furthermore, the magnetic flux, which passes through the leading end tooth 12c that is wound with the armature coil 9b commutated by the second brush 5b, decreases due to the decrease in the radial thickness in the reduced magnetic flux portion 23a.

In the range between the ¼ of the commutating angular range (the angular point of θ/4) and the middle point (the angular point of θ/2) of the commutating angular range, the magnetic flux, which passes through the leading end tooth 12a that is wound with the armature coil 9a commutated by the first brush 5a, increases due to the increase in the radial thickness in the reduced magnetic flux portion 22a. Furthermore, the magnetic flux, which passes through the leading end tooth 12c that is wound with the armature coil 9 commutated by the second brush 5b, increases due to the increase in the radial thickness in the reduced magnetic flux portion 23a.

Thereafter, in the range between the middle point of the commutation process (the point of θ/2 from the start point of the commutation process) and the end point of the commutation process (the point of θ measured from the start point of the commutation process), the leading end tooth 12a, which is wound with the armature coil 9a that is commutated by the first brush 5a, passes the point, which is radially opposed to the magnet 23 (the S-pole) that has the polarity opposite from that of the magnet 22 (the N-pole). Therefore, the magnetic flux, which has the polarity opposite from that of the magnetic flux that is present at the beginning of the commutation process, increases. Furthermore, the leading end tooth 12c, which is wound with the armature coil 9b that is commutated by the second brush 5b, passes through the point, which is radially opposed to the magnet 22 (the N-pole) that has the polarity opposite from that of the magnet 23 (the S-pole). Thus, the magnetic flux, which has the polarity opposite from that of the magnetic flux present at the begging of the commutation process, increases.

Figure 8:
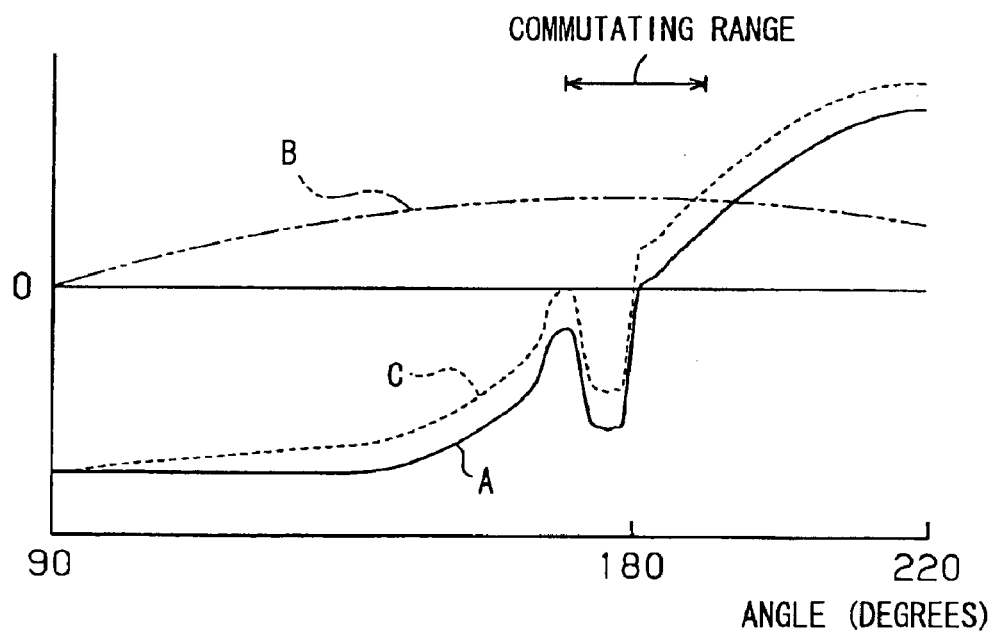
FIG. 8 is a waveform chart showing a relationship between a rotational position of an armature and induced voltage.

FIG. 8 is a waveform chart, which shows a relationship between the rotational position of the armature 4 of the motor 21 and the induced voltage generated in the armature coil 9a. In FIG. 8, a waveform A indicates the induced voltage observed at the time of supplying no electric power to the armature coil 9a, and a waveform B indicates the induced voltage generated by the armature electric current. The waveform C indicates the induced voltage at the time of supplying electric power to the armature coil 9a.

As shown in FIG. 8, in the motor 21 of the present embodiment, due to the change in the magnetic flux, the direction of the induced voltage, which is generated by the armature coil 9a at the time of supplying no electric power to the armature coil 9a, is reversed in the commutating angular range of the armature coil 9a based on the magnetic flux distribution shown in FIG. 7. More specifically, the induced voltage, which is generated at the time of supplying no electric power to the armature coil 9a, rapidly decreases once at the beginning of the commutation process. Thereafter, this induced voltage rapidly increases and then decreases once again. Then, the induced voltage becomes zero in the middle (180 degrees) of the commutating angular range. At the late stage of the commutation process, the direction of the induced voltage is reversed.

At the time of supplying the electric power to the armature 4, the induced voltage is generated in the armature coil 9a by the armature electric current that passes through the armature coil 9a. Thus, the waveform C of the induced voltage, which is generated in the armature coil 9a at the time of supplying electric power, is a composite waveform, which is formed by combining the waveform B of the induced voltage with the waveform A of the induced voltage. Here, the waveform B of the induced voltage is generated by the armature electric current (more specifically, the magnetic flux induced by the armature electric current), and the waveform A of the induced voltage is generated at the time of supplying no electric power, as discussed above.

When the amount of electric power supplied to the armature 4 is increased, the induced voltage, which is generated by the armature electric current, is accordingly increased (i.e., the amplitude of the induced voltage is increased). The waveform B of the induced voltage becomes a sine waveform, which has a peak at the middle (180 degrees) of the commutating angular range. A phase of the waveform B is shifted 90 degrees from the waveform A of the induced voltage, which is generated at the time of supplying no electric power. Thus, in the range (90–220 degrees) shown in FIG. 8, when the amount of electric power supplied to the armature 4 is increased, the waveform C of the induced voltage, which is generated at the time of supplying electric power, becomes a waveform that is formed by upwardly shifting the waveform A of the induced voltage of FIG. 8, which is generated at the time of supplying no electric power.

Next, a change in the induced voltage and a change in the commutation electric current in the motor 21 at the time of increasing the amount of electric power supplied to the armature coil 9a, 9b will be described.

Figure 9A:
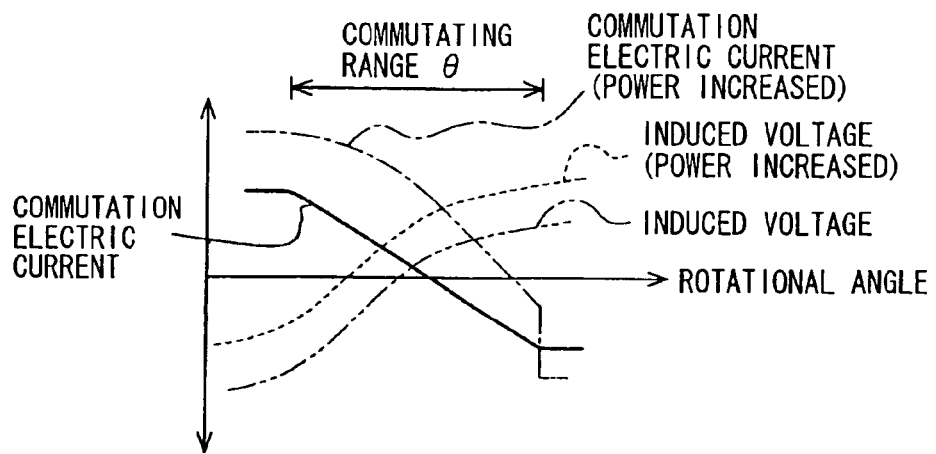
FIG. 9A is a waveform chart showing a change in electric current and a change in induced voltage at the time of commutation in the first embodiment.
Figure 9B:
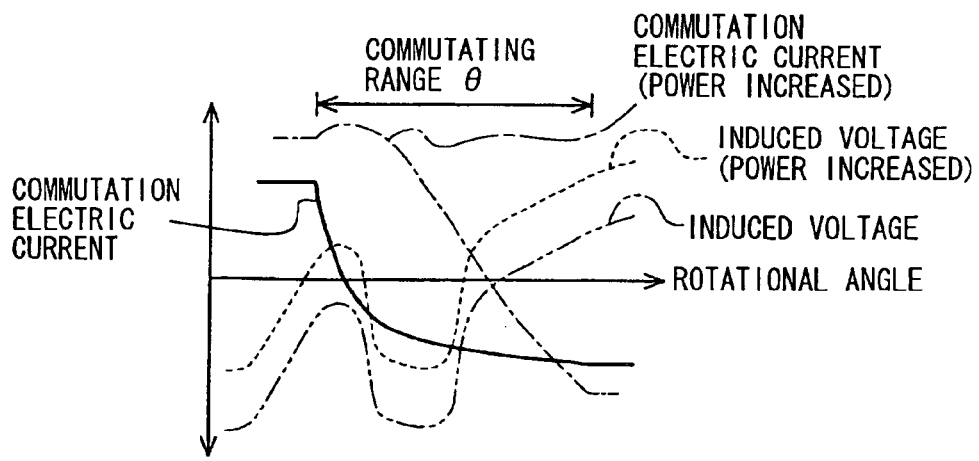
FIG. 9B is a waveform chart showing a change in electric current and a change in induced voltage at the time of commutation in the second embodiment.

Each of FIGS. 9A and 9B shows a change in the induced voltage and a change in the commutation electric current at the time of commutation with respect to a rotational angle of the armature 4. More specifically, FIG. 9A shows the changes in the motor 1 of the first embodiment, and FIG. 9B shows the changes in the motor 21 of the present embodiment. Each waveform chart shown in FIG. 9A or 9B also shows a change in the induced voltage and a change in the commutation electric current at the time of increasing the electric power supplied to the armature coil 9a, 9b.

As shown in FIG. 9A, the slope of the induced voltage in the commutating angular range of the motor 1 is greater than that of the comparative example as discussed in the first embodiment. Thus, at the beginning of the commutation process, the relatively large induced voltage is obtained. As a result, the commutation process is facilitated. However, when the amount of electric power, which is supplied to the armature coil 9a, 9b, is increased, the induced voltage is increased throughout the commutating angular range to increase the commutation electric current. Therefore, the timing for switching the commutation electric current is delayed at the end of the commutation process, so that the electric current could be abruptly switched at the end of the commutation process.

Contrary to this, as shown in FIG. 9B, in the motor 21 of the second embodiment, in the initial stage of the commutation process, the amount of magnetic flux, which is generated from the magnets and passes across the armature coil 9a, 9b under the commutation process, decreases. This is due to a change in the magnetic flux of the reduced magnetic flux portions 22a, 23a of the magnets 22, 23. As a result, in the initial stage of the commutation process, the induced voltage is generated in the retarding direction for retarding the commutation process. Therefore, even when the induced voltage is increased throughout the commutating angular range by increasing the amount of electric power supplied to the armature coil 9a, 9b, the abrupt switching of the electric current can be limited in the late stage of the commutation process.

The motor 21 (the direct current machine) of the second embodiment provides the following advantages in addition to the advantages discussed in the first embodiment.

(1) In the present embodiment, the front circumferential end portion of each magnet 22, 23, which is located in the front end of the magnet 22, 23 in the rotational direction of the armature 4, has the reduced magnetic flux portion 22a, 23a. The length of the reduced magnetic flux portion 22a, 23a corresponds to the first half of the commutation. Thus, in the first half of the commutation, the amount of magnetic flux, which is generated from one of the magnets 22, 23 and through which the leading end tooth 12a, 12c of the armature coil 9a, 9b under the commutation passes, decreases. Therefore, the induced voltage is generated in the retarding direction for retarding the commutation process, so that the commutation can be improved.

(2) In the present embodiment, each reduced magnetic flux portions 22a, 23a is formed in the corresponding magnet 22, 23 in such a manner that the amount of magnetic flux decreases toward the circumferential center of the reduced magnetic flux portion 22a, 23a. Thus, upon initiation of the commutation process, the induced voltage is generated in the retarding direction for retarding the commutation in ¼ of the commutating angular range. Thereafter, the induced voltage is generated in the facilitating direction for facilitating the commutation until the half point of the commutating angular range is reached. As a result, the commutation is effectively improved.

(3) In the present embodiment, each reduced magnetic flux portion 22a, 23a is formed by notching or recessing the portion of the corresponding magnet 22, 23. Thus, by adjusting the shape of the magnet 22, 23, a desired magnetic flux distribution can be achieved.

(Third Embodiment)

A third embodiment, in which the present invention is embodied in a three brush direct current motor, will be described with reference to the drawings. The components similar to those of the second embodiment will not be described or depicted, and different points, which are different from those of the second embodiment, will be mainly described.

Figure 10:
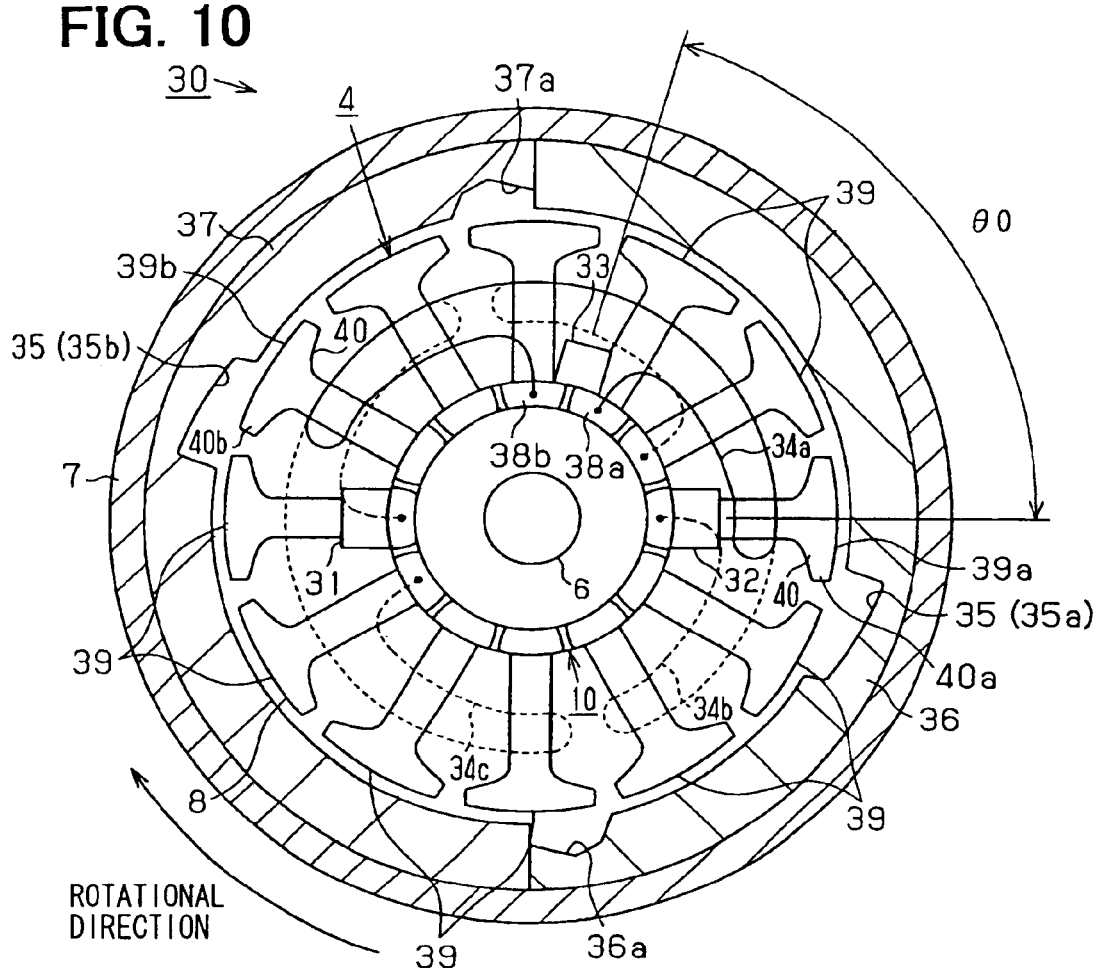
FIG. 10 is a schematic cross sectional view of a motor according to a third embodiment of the present invention.

As shown in FIG. 10, the motor 30 of the present embodiment includes first to third brushes 31–33. The first brush 31 and the second brush 32 are arranged to oppose one another, i.e., are arranged at 180 degree intervals about the center axis of the armature 4, i.e., the rotatable shaft 6. The third brush 33 is spaced a predetermined angle θ0 from the second brush 32. Through operation of a switch (not shown), operation will be switch from a group of the first brush 31 and the second brush 32 to a group of the first brush 31 and the third brush 33 and vice versa. That is, through switching between the second brush and the third brush, one of a normal mode (low speed rotation) and a high speed mode (high speed rotation) can be selected.

In the present embodiment, the first brush 31 and the second brush 32 are arranged in a low speed rotational position, which is a normal position. Furthermore, the first brush 31 and the third brush 33 are arranged in a high speed rotational position. When the electric current is supplied through the first brush 31 and the second brush 32, the normal mode is achieved. Also, when the electric current is supplied through the first brush 31 and the third brush 33, the high speed mode is achieved.

The motor 30 of the present embodiment includes a pair of magnets 36, 37. Each magnet 36, 37 additionally includes a second reduced magnetic flux portion 35, which is formed to correspond with an armature coil 34a, which is short circuited by the third brush 33 upon rotation of the armature 4 in the normal mode, i.e., in the state where the armature 4 is rotated upon power supply through the first brush 31 and the second brush 32.

More specifically, each magnet 36, 37 is formed into a semi-cylindrical shape, which has the arc angle of 180 degrees like each of the magnets 22, 23 (FIG. 6) of the motor 21 of the second embodiment. A front circumferential end portion of each magnet 36, 37, which is located in a front end of the magnet 36, 37 in the rotational direction of the armature 4, includes a first reduced magnetic flux portion 36a, 37a. The first reduced magnetic flux portion 36a, 37a is formed to correspond with the armature coil 34b, 34c, which is under the commutation process in the normal mode. The second reduced magnetic flux portion 35 is formed in each magnet 36, 37 in addition to the first reduced magnetic flux portion 36a, 37a.

More specifically, the second reduced magnetic flux portion 35a is formed in a predetermined point of the magnet 36, which corresponds to the leading end tooth 39a of the group of six teeth 39, around which the armature coil 34a that is short circuited by the third brush 33 in the normal mode, is wound. More specifically, the second reduced magnetic flux portion 35a is formed in the predetermined point, through which a front end of the leading end tooth 39a, i.e., a leading end 40a of a tooth bar 40 of the leading end tooth 39a passes when the third brush 33 short circuits between the two adjacent segments 38a, 38b, which are connected to one another through the armature coil 34a.

Similarly, the second reduced magnetic flux portion 35b is formed in a predetermined point of the magnet 37, which corresponds to the trailing end tooth 39b of the group of six teeth 39, around which the armature coil 34a that is short circuited by the third brush 33 in the normal mode, is wound. More specifically, the second reduced magnetic flux portion 35b is formed in the predetermined point, through which a rear end of the trailing end tooth 39b, i.e., a trailing end 40b of a tooth bar 40 of the trailing end tooth 39b passes when the third brush 33 short circuits between the two adjacent segments 38a, 38b, which are connected to one another through the armature coil 34a.

Each second reduced magnetic flux portion 35 (35a, 35b) is formed to have an angular extent, which corresponds to a rotational angle that coincides with a period of short circuiting the armature coil 34a by the third brush 33, i.e., a period of short circuiting the segments 38a, 38b by the third brush 33. The magnetic flux density of each second reduced magnetic flux portion 35 (35a, 35b) is set such that the magnetic flux density progressively increases from a rear circumferential end of the second reduced magnetic flux portion 35 (35a, 35b), which is a rear end of the second reduced magnetic flux portion 35 (35a, 35b) in the rotational direction of the armature 4, toward a front circumferential end of the second reduced magnetic flux portion 35 (35a, 35b), which is a front end of the second reduced magnetic flux portion 35 (35a, 35b) in the rotational direction of the armature 4.

In the present embodiment, the radial thickness of each second reduced magnetic flux portion 35 is reduced by notching or recessing a portion (i.e., a surface that is opposed to the armature 4) of the corresponding magnet 36, 37 to have the reduced magnetic flux density in comparison to an adjacent section of the magnet 36, 37, which is located adjacent to the second reduced magnetic flux portion 35. Furthermore, the radial thickness of each second reduced magnetic flux portion 35 progressively increases from the rear circumferential end to the front circumferential end of the second reduced magnetic flux portion 35. Thus, the magnetic flux density progressively increases from the rear circumferential end to the front circumferential end of the second reduced magnetic flux portion 35.

Next, operation of the motor 30 will be described.

Figure 11:
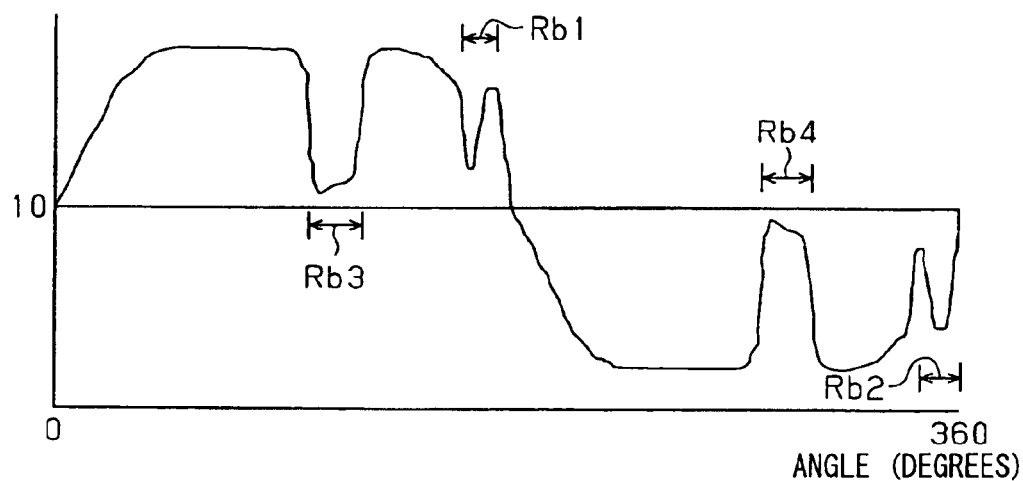
FIG. 11 is a waveform chart showing distribution of magnetic flux (magnetic flux density) in the motor of the third embodiment.

With reference to FIG. 11, the distribution of the magnetic flux of the motor 30 of the present embodiment includes reduced magnetic flux ranges Rb3, Rb4, which correspond to the second reduced magnetic flux portions 35a, 35b of the magnets 36, 37, in addition to reduced magnetic flux ranges Rb1, Rb2, which correspond to the first reduced magnetic flux portions 36a, 37a of the magnets 36, 37. In each of the reduced magnetic flux range Rb3, Rb4, the magnetic flux progressively increases in the rotational direction of the armature 4 according to the shape of the corresponding second reduced magnetic flux portion 35.

Figure 12:
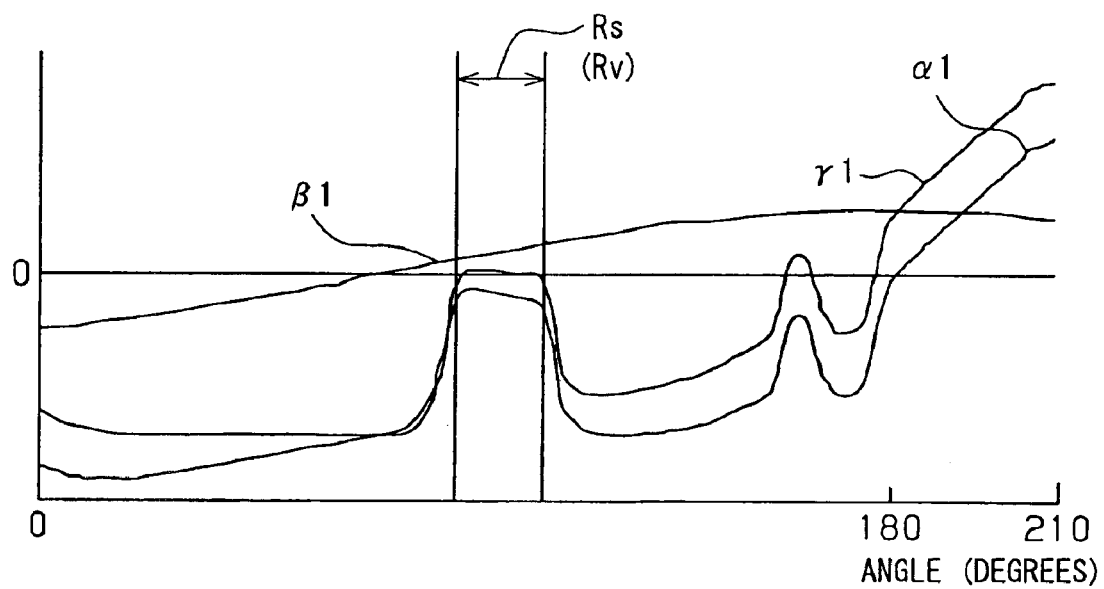
FIG. 12 is a waveform chart showing a relationship between a rotational position of an armature and induced voltage generated in an armature coil in the motor of the third embodiment.

With reference to FIG. 12, in the motor 30 of the present embodiment, a waveform α1 of the induced voltage, which is generated in the armature coil 34a at the time of supplying no electric power, has a voltage dropping range RV, which corresponds to the reduced magnetic flux range Rb3 (FIG. 11), in a short circuiting range Rs for short circuiting the armature coil 34a by the third brush 33. In the voltage dropping range Rv, the induced voltage, which is generated in the armature coil 34a at the time of supplying no electric power, has a dropping peak at the beginning of the short circuiting and gradually increases until the end of the short circuiting.

Figure 13:
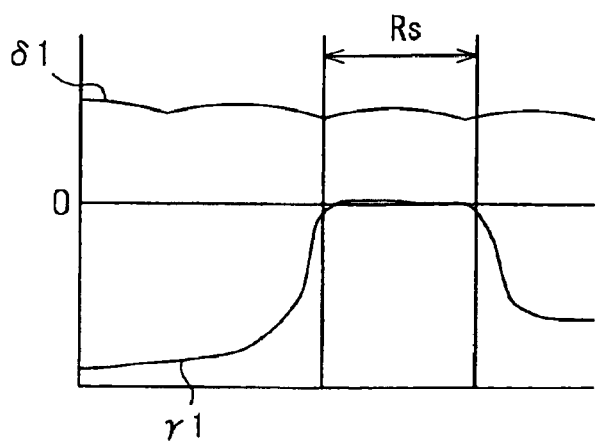
FIG. 13 is a waveform chart showing a relationship between induced voltage at the time of increasing armature electric current and electric current in an armature coil in the motor of the third embodiment.

According to the present embodiment, in the short circuiting range Rs, the shape of the second reduced magnetic flux portion 35 is set such that the waveform α1 of the induced voltage is symmetrical with a waveform β1 of the induced voltage about a line, which indicates the induced voltage of zero. Here, the waveform α1 of the induced voltage is generated at the time of supplying no electric power, and the waveform β1 of the induced voltage is generated by the armature electric current at the time of increasing the supplied electric power. Therefore, the induced voltage, which is generated at the time of supplying the electric power and is indicated by a composite waveform γ1, becomes substantially zero in the short circuiting range Rs. Here, the composite waveform γ1 is formed by combining the waveform α1 with the waveform β1. Thus, as shown in FIG. 13, even in the short circuiting range Rs, a waveform (a commutation waveform) δ1 of electric current, which passes through the armature coil 34a, is not disturbed. As a result, even when the supplied electric current is increased due to an increase in the load or a change in the operating condition, effective commutation can be maintained.

Figure 14:
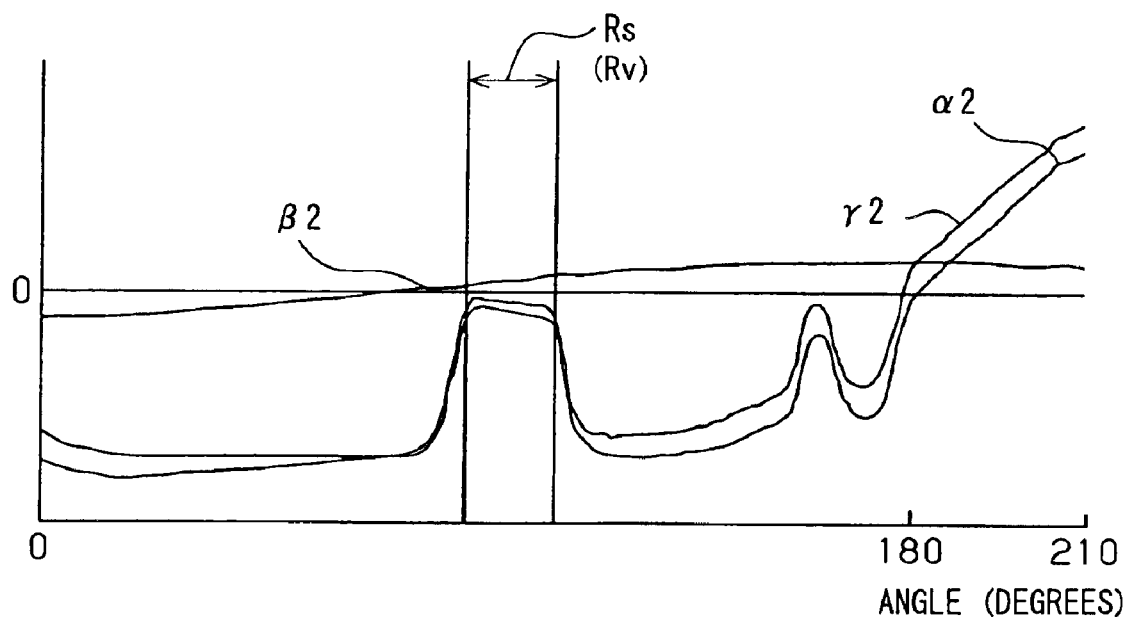
FIG. 14 is a waveform chart showing a relationship between a rotational position of the armature and induced voltage generated in the armature coil at the normal period in the motor of the third embodiment.
Figure 15:
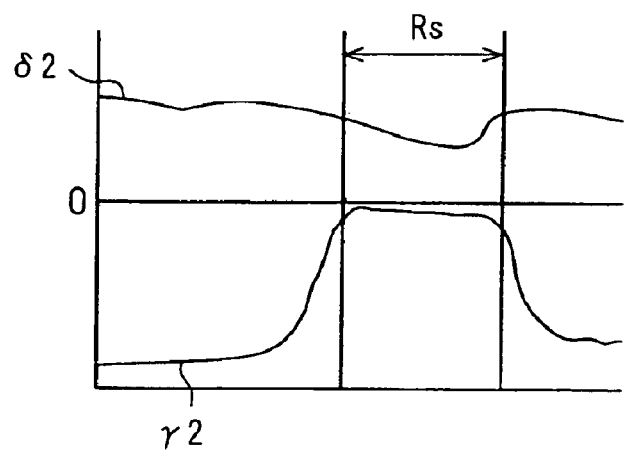
FIG. 15 is a waveform chart showing a relationship between induced voltage, which is generated at the time of supplying electric power, and electric current in the armature coil at the normal period of the third embodiment.

Furthermore, at the time of increasing the supplied electric power shown in FIGS. 12 and 13, the induced voltage, which is generated by the armature electric current, is increased relative to the induced voltage, which is generated in a normal period (i.e., a period where the supplied electric current is not increased). Thus, the waveform β1 of the induced voltage, which is generated at the time of increasing the supplied electric power, is upwardly shifted in comparison to a waveform β2 of the induced voltage, which is generated at the time of the normal period, as shown in FIG. 14. Thus, at the time of the normal period shown in FIG. 14, a waveform γ2 of the induced voltage is shifted downward relative to the waveform γ1 of the induced voltage shown in FIG. 12. Here, the waveform γ2 of the induced voltage is generated at the time of supplying electric power. Furthermore, the waveform γ2 is a composite waveform, which is formed by combining the waveform β2 of the induced voltage and the waveform α2 of the induced voltage. The waveform β2 of the induced voltage is generated by the armature electric current. The waveform α2 of the induced voltage is generated at the time of supplying no electric power. However, the induced voltage, which is generated by the armature electric current, is cancelled by the effect of the voltage dropping range Rv, which corresponds to the second reduced magnetic flux portion 35. Thus, as shown in FIG. 15, the waveform (commutation waveform) δ2 of electric current, which passes through the armature coil 34a, is not substantially disturbed in the short circuiting range Rs.

Figure 16:
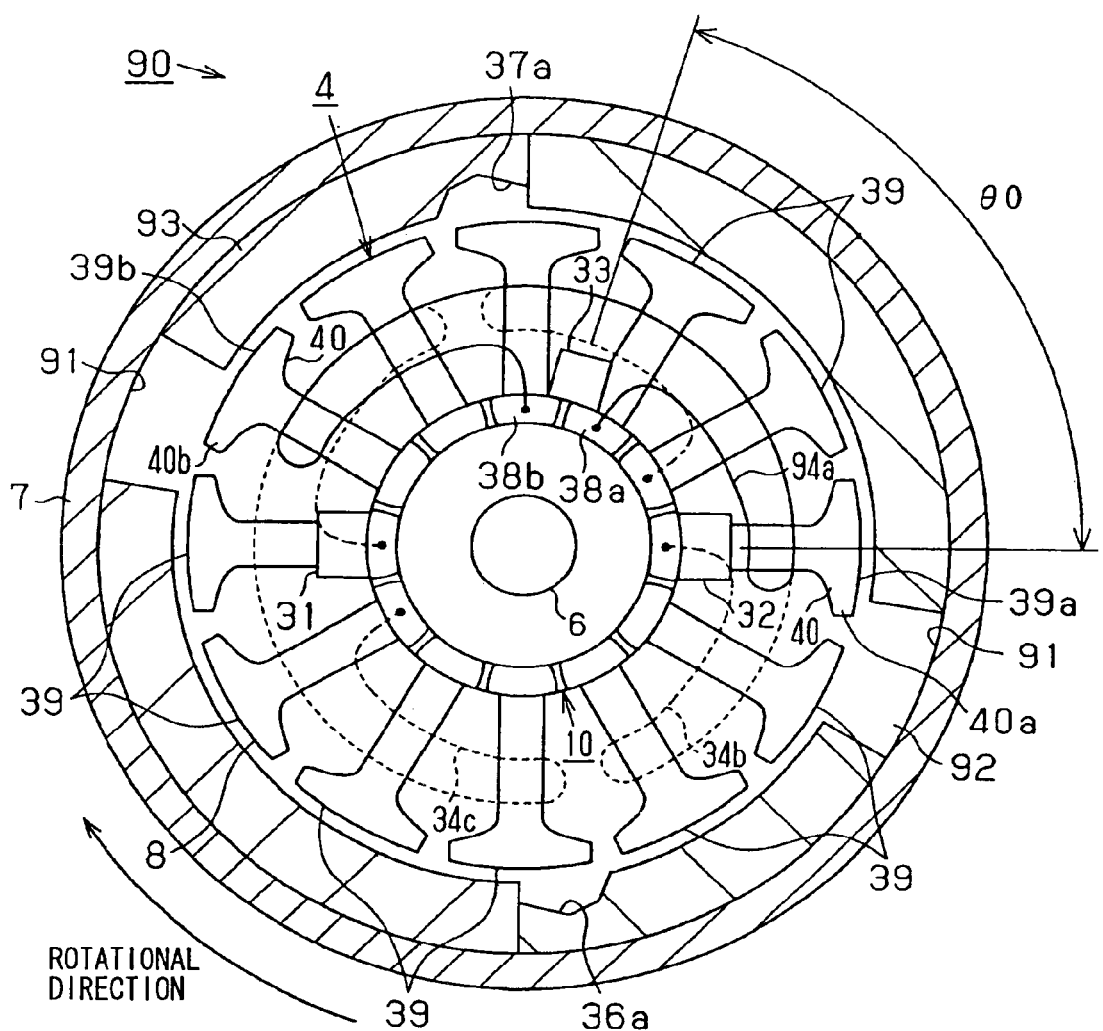
FIG. 16 is a schematic cross sectional view of a motor of a comparative example.
Figure 17:
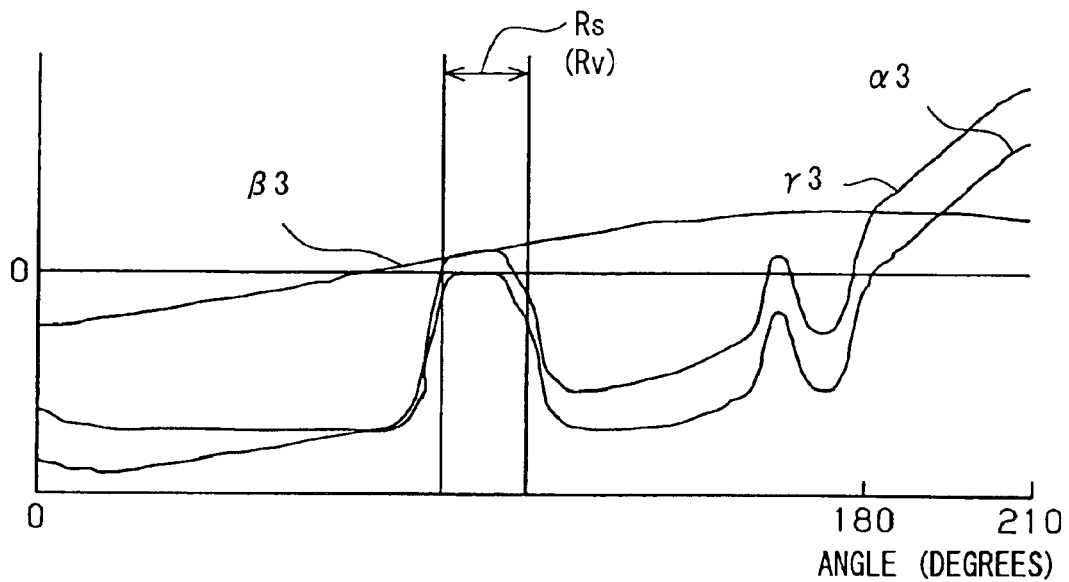
FIG. 17 is a waveform chart showing a relationship between a rotational position of an armature and induced voltage generated in an armature coil in the motor of the comparative example.
Figure 18:
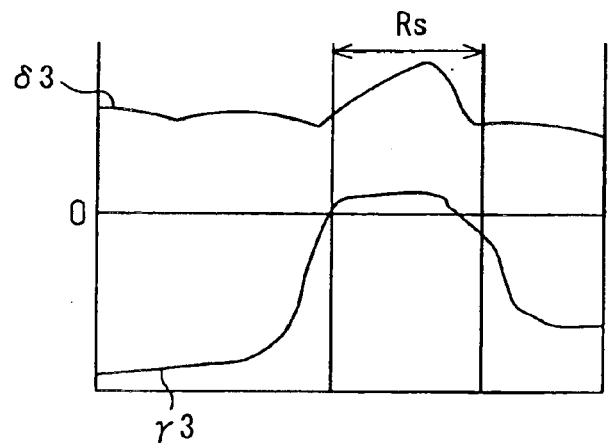
FIG. 18 is a waveform chart showing a relationship between induced voltage at the time of increasing armature electric current and electric current in an armature coil in the motor of the comparative example.

Contrary to this, in a case of a motor 90 of a comparative example shown in FIG. 16, a zero magnetic flux portion 91 is provided in each magnet 92, 93 at a location (FIG. 10), which corresponds to that of the second reduced magnetic flux portion 35 of the motor 30, in place of the reduced magnetic flux portion 35. In this case, as shown in FIG. 17, the induced voltage, which is indicated by a waveform α3 and is generated at the time of supplying no electric power, becomes substantially zero in the short circuiting range Rs. Thus, in the short circuiting range Rs, a waveform γ3 of the induced voltage, which is generated at the time of supplying the electric power, substantially coincides with a waveform β3 of the induced voltage, which is generated by the armature electric current. Therefore, as shown in FIG. 18, at the time of increasing the supplied electric power, a waveform δ3 of electric current, which passes through the armature coil 94a, is substantially disturbed in the short circuiting range Rs.

Thus, in the case where the supplied electric power is increased due to the change in the operating condition, the better commutation can be achieved by forming the second reduced magnetic flux portion 35 in each magnet 36, 37 like in the motor 30 of the present embodiment in comparison to the case where the zero magnetic flux portion 91 is formed in each magnet 92, 93 like in the motor 90 of the comparative example.

The motor 30 (the direct current machine) of the present embodiment provides the following advantages in addition to the advantages discussed in the second embodiment.

(1) The motor 30 includes the first to third brushes 31–33 and the pair of semi-cylindrical magnets 36, 37, each of which has the arc angle of 180 degrees. The first brush 31 and the second brush 32 are opposed to one another about the center axis of the armature 4, i.e., about the rotational shaft 6. The third brush 33 is spaced the predetermined angle θ0 from the second brush 32.

The magnet 36 includes the second reduced magnetic flux portion 35a, which is formed in the predetermined point, through which the distal end of the leading end tooth 39a that is wound with the armature coil 34a passes when the third brush 33 short circuits the armature coil 34a. The magnet 37 includes the second reduced magnetic flux portion 35b, which is formed in the predetermined point, through which the rear end of the trailing end tooth 39b passes.

With this arrangement, the induced voltage, which is generated by supplying the electric power to the armature coil 34a, can be cancelled in the short circuiting range Rs. Thus, even when the amount of supplied electric power is increased due to the increase in the load or the change in the operating condition, the disturbance of the electric current, which passes through the armature coil 34a, can be limited at the time of short circuiting to maintain the effective commutation.

(2) Each second reduced magnetic flux portion 35 (35a, 35b) is shaped to progressively increase the radial thickness from the rear circumferential end of the second reduced magnetic flux portion 35 toward the front circumferential end of the second reduced magnetic flux portion 35 in the rotational direction of the armature 4. Thus, the magnetic flux density gradually increases from the rear circumferential end of the second reduced magnetic flux portion 35 toward the front circumferential end of the second reduced magnetic flux portion 35 in the rotational direction of the armature 4. With this arrangement, the induced voltage, which is generated in the armature coil 34a at the time of increasing supplied electric power, can be made substantially zero in the short circuiting range Rs. Therefore, the disturbance of the electric current, which passes through the armature coil 34a at the time of short circuiting can be limited to maintain the effective commutation.

The above embodiments can be modified as follows.

Figure 19:
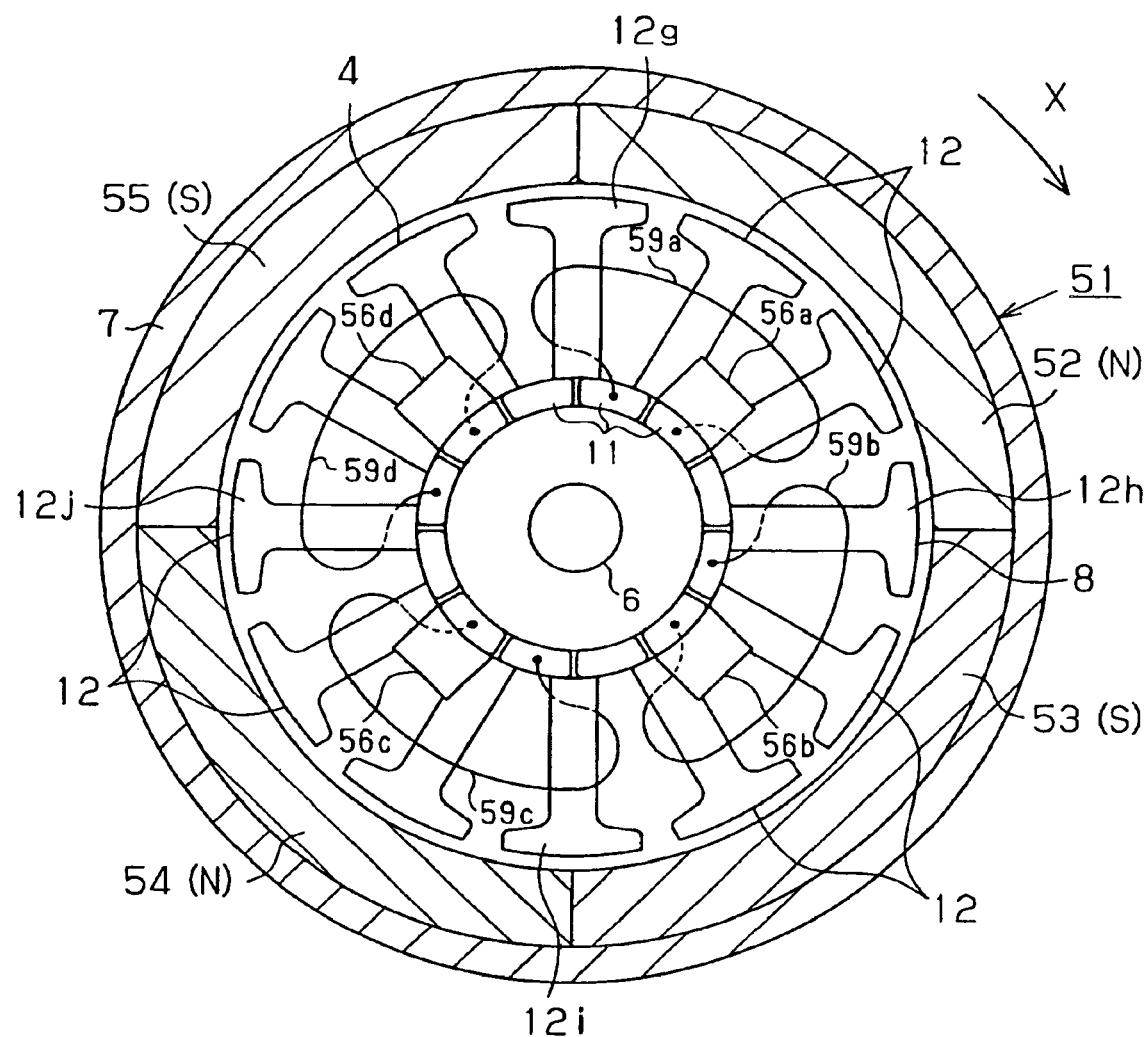
FIG. 19 is a schematic cross sectional view showing a modification of the motor.

In the first embodiment, the motor 1 includes the two magnets 2, 3, i.e., the single N-pole magnet and the single S-pole magnet. However, as shown in FIG. 19, four magnets 52–55 can be arranged about the armature 4 to form a motor 51 having four poles. In the motor 51, the magnet 52 of N-pole and the magnet 54 of N-pole are opposed to one another about the armature 4, and the magnet 53 of S-pole and the magnet 55 of S-pole are opposed to one another about the armature 4. Each armature coil 59a–59d connects between corresponding two adjacent segments 11, which are short circuited by a corresponding brush 56a–56d. Furthermore, each armature coil 59a–59b is wound around a corresponding group of three teeth 12. At the beginning of the commutation process, the center line of each trailing end tooth 12g, 12h, 12i, 12j of each group of three teeth 12 is positioned at a boundary between corresponding two adjacent magnets 52–55. Even in the motor 51, similar to the first embodiment, the commutation can be improved.

In the second embodiment, each reduced magnetic flux portion 22a, 23a is constructed to gradually reduce the magnetic flux from the circumferential ends of the reduced magnetic flux portion 22a, 23a toward the circumferential center of the reduced magnetic flux portion 22a, 23a. However, the distribution of the magnetic flux in each magnet can be changed in any appropriate manner as long as the magnetic flux is changed to retard the commutation in the first half of the commutation process and to prevent occurrence of the electric current stop, which could be induced by retardation of switching of the commutation electric current, at the late stage of the commutation process. It can be constructed to correspond with the amount of electric power supplied to the corresponding armature coil.

Figure 20:
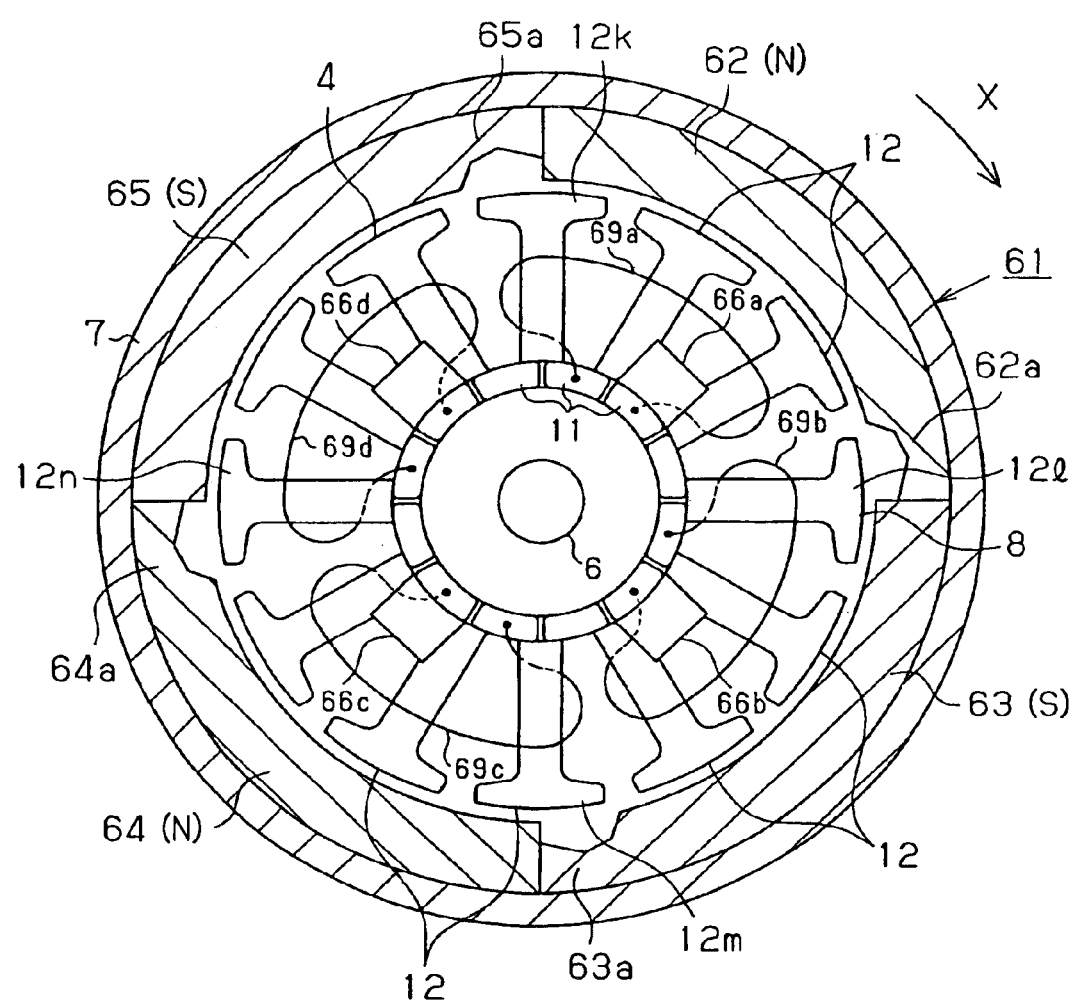
FIG. 20 is a schematic cross sectional view showing a modification of the motor.
Figure 21:
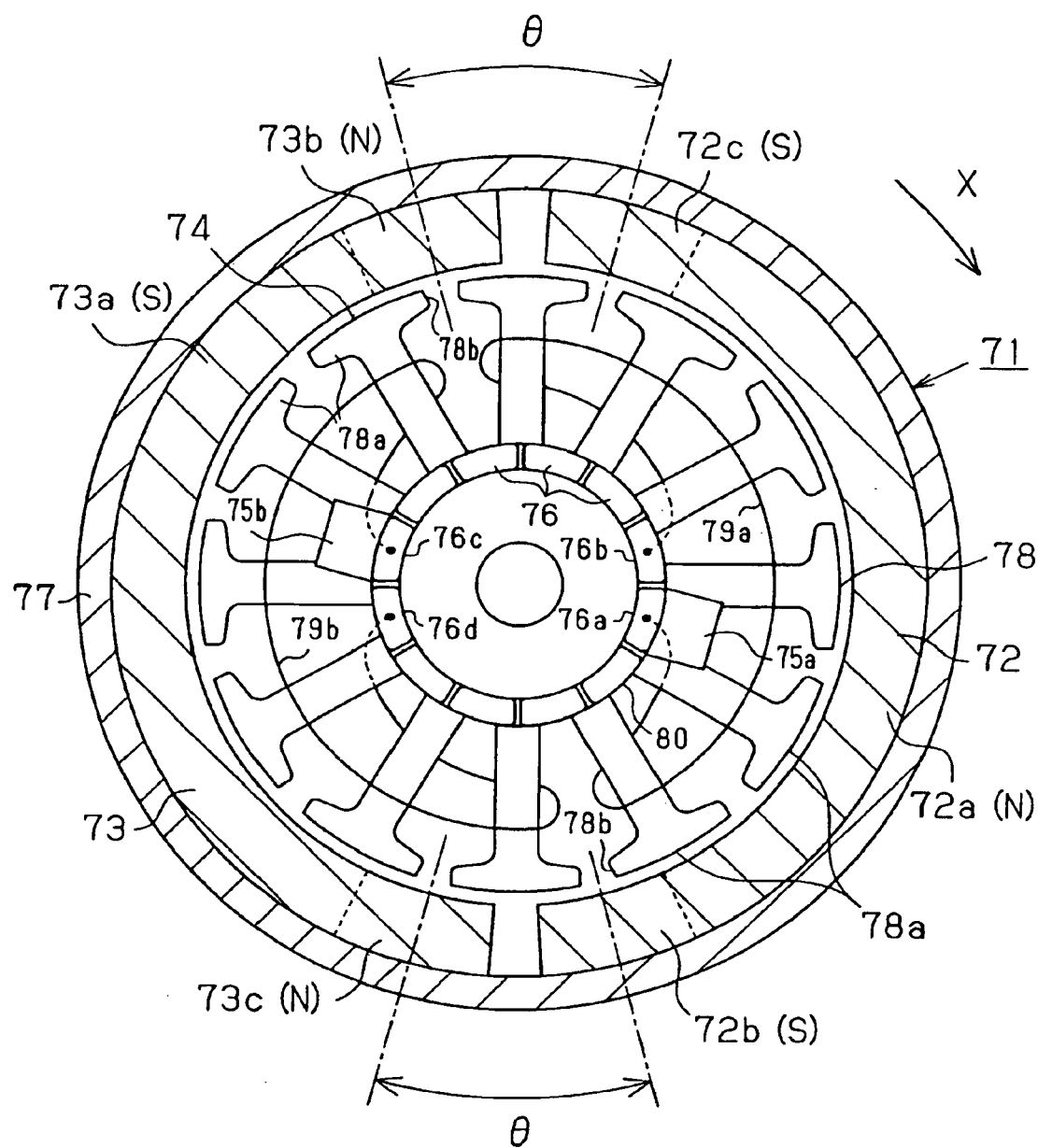
FIG. 21 is a schematic cross sectional view of a prior art motor.

In the second embodiment, the motor 21 has the two magnets 22, 23, i.e., the single N-pole magnet and the single S-pole magnet. However, as shown in FIG. 20, four magnets 62–65 can be arranged about the armature 4 to form a motor 61 having four poles. In the motor 61, the magnet 62 of N-pole and the magnet 64 of N-pole are opposed to one another about the armature 4, and the magnet 63 of S-pole and the magnet 65 of S-pole are opposed to one another about the armature 4. The armature 4 is rotated in a single direction of arrow X in FIG. 20. A notch or recess is formed in a front circumferential end portion of each magnet 62–65, which is located in a front end of the magnet 62–65 in the rotational direction of the armature 4 to reduce the radial thickness of the magnet 62–65 and thereby to form a reduced magnetic flux portion 62a, 63a, 64a, 65a. Each armature coil 69a–69b connects between corresponding two adjacent segments 11, which are short circuited by a corresponding brush 66a–66d. Furthermore, each armature coil 69a–69d is wound around a corresponding group of three teeth 12. At the beginning of the commutation process, the center line of each trailing end tooth 12k, 12l, 12m, 12n of each group of three teeth 12 is positioned at a boundary between corresponding two adjacent magnets 62–65. Even in the motor 61, similar to the second embodiment, the commutation can be improved.

In the second (third) embodiment, the reduced magnetic flux portions 22a, 23a (35) are formed by notching or recessing the portion of the magnet 22, 23 (36, 37). However, each reduced magnetic flux portion can be formed in any other appropriate manner as long as the desired distribution of the magnetic flux is obtained in each magnet 22, 23 (36, 37). For example, the radial thickness of each magnet 22, 23 (36, 37) can be made uniform, and the magnetization of each magnet can controlled to change the distribution of the magnetic flux at a location, which corresponds to the reduced magnetic flux portion. Thus, each reduced magnetic flux portion 22a, 23a (35) can be formed upon installation of each magnet 22, 23 (36, 37). In this way, the manufacturing steps can be simplified.

In the above embodiments, the magnetic poles can be formed in a single cylindrical magnet by controlling magnetization. For example, alternative to the magnets 2, 3 of the first embodiment, it is possible to provide a single cylindrical magnet that is magnetized to have a single N-pole and a single S-pole arranged one after the other in a circumferential direction. Also, the magnets 22, 23 of the second embodiment can be integrated into a single cylindrical magnet through control of magnetization. Furthermore, in place of the four magnets 52–55 of FIG. 19, it is possible to provide two semi-cylindrical magnets, each has a single N-pole and a single S-pole arranged one after the other.

Additional advantages and modifications will readily occur to those skilled in the art. The invention in its broader terms is therefore not limited to the specific details, representative apparatus, and illustrative examples shown and described.

What is claimed is:

1. A direct current machine comprising:
a cylindrical yoke;
a plurality of magnetic poles that are continuously arranged one after the other along an entire inner peripheral surface of the cylindrical yoke to provide alternating magnetic polarities along the inner peripheral surface of the cylindrical yoke; and
an armature that is received radially inward of the plurality of magnetic poles in the cylindrical yoke, wherein the armature includes:
 an armature core that includes a plurality of teeth, which are arranged at generally equal angular intervals; and
 a plurality of armature coils, each of which is wound around a corresponding group of teeth selected from the plurality of teeth, wherein:
when one of the plurality of armature coils is in a beginning of a commutation process, a center line of a trailing end tooth of the corresponding group of the teeth, around which the one of the plurality of armature coils is wound, is generally aligned with a corresponding one of a plurality of boundaries, each of which is formed between corresponding adjacent two circumferential ends of the plurality of magnetic poles; and
when the one of the plurality of armature coils is in an end of the commutation process, a center line of a leading end tooth of the corresponding group of the teeth is generally aligned with a corresponding one of the plurality of boundaries.

2. The direct current machine according to claim 1, wherein a front circumferential end portion of each magnetic pole, which is located in a front end of the magnetic pole in a rotational direction of the armature, forms a reduced magnetic flux portion, in which an amount of magnetic flux is reduced in comparison to an adjacent section of the magnetic pole that is located adjacent to the reduced magnetic flux portion, wherein an angular extent of each reduced magnetic flux portion is generally equal to a first half of a commutating angular range of each of the plurality of armature coils.

3. The direct current machine according to claim 2, wherein the magnetic flux of each reduced magnetic flux portion progressively decreases from circumferential ends of the reduced magnetic flux portion toward a circumferential center of the reduced magnetic flux portion.

4. The direct current machine according to claim 2, wherein the reduced magnetic flux portion of each magnetic pole is formed by reducing a radial thickness of the magnetic pole in comparison to the adjacent section of the magnetic pole.

5. The direct current machine according to claim 2, wherein the reduced magnetic flux portion of each magnetic pole is formed by controlling magnetization of the magnetic pole.

6. The direct current machine according to claim 2, further comprising first to third brushes for supplying electric power to the armature, wherein:
the first brush and the second brush are arranged to oppose one another about the armature;
the third brush is spaced a predetermined angle from the second brush;
the plurality of magnetic poles includes two magnetic poles, each of which has an angular extent of 180 degrees;
the reduced magnetic flux portion of each magnetic pole is a first reduced magnetic flux portion of each magnetic pole; and at least one of the two magnetic poles includes a second reduced magnetic flux portion, in which an amount of magnetic flux is reduced in comparison to an adjacent section of the magnetic pole that is adjacent to the second reduced magnetic flux portion, wherein the second reduced magnetic flux portion is formed to correspond with a corresponding each of the plurality of armature coils that is short circuited by the third brush.

7. The direct current machine according to claim 6, wherein when one of the plurality of armature coils is short circuited through the third brush, a leading end of a leading end tooth of the corresponding group of the teeth, around which the short circuited one of the plurality of armature coils is wound, passes at least a part of the corresponding second reduced magnetic flux portion.

8. The direct current machine according to claim 6, wherein when one of the plurality of armature coils is short circuited through the third brush, a trailing end of a trailing end tooth of the corresponding group of the teeth, around which the short circuited one of the plurality of armature coils is wound, passes at least a part of the corresponding second reduced magnetic flux portion.

9. The direct current machine according to claim 6, wherein the second reduced magnetic flux portion of the at least one of the two magnetic poles is formed such that a magnetic flux of the second reduced magnetic flux portion progressively increases from a rear circumferential end toward a front circumferential end of the second reduced magnetic flux portion in the rotational direction of the armature.

10. The direct current machine according to claim 6, wherein the second reduced magnetic flux portion of the at least one of the two magnetic poles is formed by reducing a radial thickness of the magnetic pole in comparison to the adjacent section of the magnetic pole that is located adjacent to the second reduced magnetic flux portion.

11. The direct current machine according to claim 6, wherein the second reduced magnetic flux portion of the at least one of the two magnetic poles is formed by controlling magnetization of the magnetic pole.

12. The direct current machine according to claim 1, further comprising four brushes for supplying electric power to the armature, wherein the plurality of magnetic poles includes four magnetic poles.

13. The direct current machine according to claim 1, wherein each group of teeth has a total angular extent that is generally the same as an angular extent of each magnetic pole.

14. The direct current machine according to claim 1, wherein each of the plurality of magnetic poles is formed separately from the rest of the plurality of magnetic poles.

* * * * *